United States Patent
Hainberger et al.

(10) Patent No.: US 7,054,060 B2
(45) Date of Patent: May 30, 2006

(54) RAMAN AMPLIFICATION SYSTEM UTILIZING BI-DIRECTIONAL PUMPING

(75) Inventors: Rainer Hainberger, Vienna (AT); Takafumi Terahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/998,173

(22) Filed: Nov. 29, 2004

(65) Prior Publication Data

US 2005/0152025 A1    Jul. 14, 2005

Related U.S. Application Data

(63) Continuation of application No. PCT/JP02/05959, filed on Jun. 14, 2002.

(51) Int. Cl.
*H01S 3/00* (2006.01)
(52) U.S. Cl. ..................... 359/334; 359/337
(58) Field of Classification Search ........ 359/334, 359/337
See application file for complete search history.

(56) References Cited

U.S. PATENT DOCUMENTS

| | | | |
|---|---|---|---|
| 6,867,905 B1 * | 3/2005 | Griseri et al. | 359/334 |
| 6,903,863 B1 * | 6/2005 | Carniel et al. | 359/334 |
| 2001/0036004 A1 | 11/2001 | Ackerman et al. | |
| 2002/0145793 A1 | 10/2002 | Bock et al. | |

FOREIGN PATENT DOCUMENTS

| | | |
|---|---|---|
| EP | 1 130 704 A2 | 9/2001 |
| EP | 1 130 705 A2 | 9/2001 |
| EP | 1 239 558 A2 | 9/2002 |
| JP | 2002 23206 A | 1/2002 |
| WO | 02/29943 A2 | 4/2002 |

OTHER PUBLICATIONS

W. Jiang et al., "Crosstalk in Fiber Raman Amplification for WDM Systems", Journal of Lightwave Technology, vol. 7, No. 9, Sep. 1989, pp. 1407-1411.
Y. Emori et al., "100 nm bandwidth flat gain Raman amplifiers pumped and gain-equalized by 12-wavelength-channel WDM high power laser diodes", Optical Fiber Communication Conference 1999 Technical Digest, pp. PD19-1 to PD19-3 Suppl.
Kaminov et al., Optical Fiber Telecommunications IIIA, Academic Press, 1997, pp. 212-225, and 252-255.
K. Inoue, "Polarization Effect on Four-Wave Mixing Efficiency in a Single-Mode Fiber", IEEE Journal of Quantum Electronics, vol. 28, No. 4, Apr. 1992, pp. 883-894.
R.E. Neuhauser et al., "Impact of nonlinear pump interactions on broadband distributed Raman amplification", Optical Fiber Communication Conference 2001, Technical Digest, pp. MA4-1 to MA4-3.

* cited by examiner

*Primary Examiner*—Mark Hellner
(74) *Attorney, Agent, or Firm*—Staas & Halsey LLP

(57) ABSTRACT

In an optical transmission system utilizing bi-directional Raman amplification, propagation directions and wavelengths of Raman pumps are chosen such that four-wave mixing products among the pump wavelengths are minimized in a signal wavelength region.

15 Claims, 35 Drawing Sheets

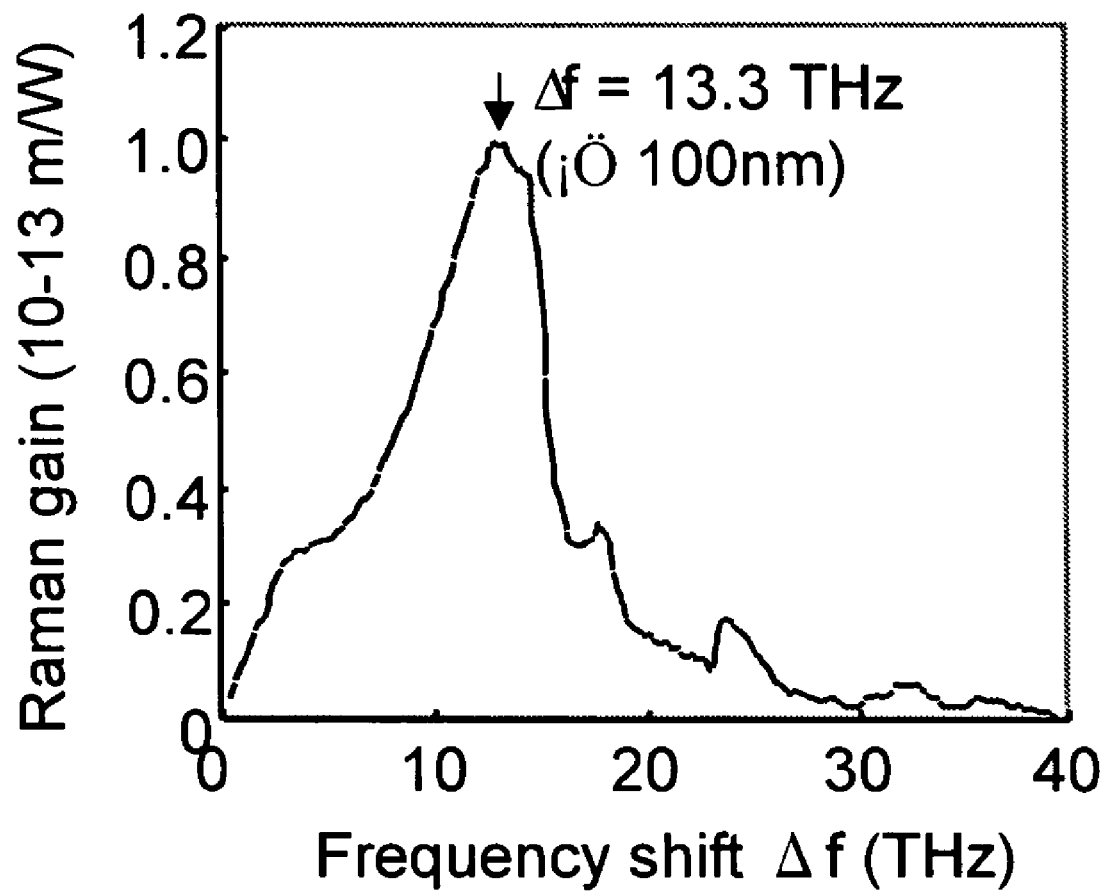
F I G. 1

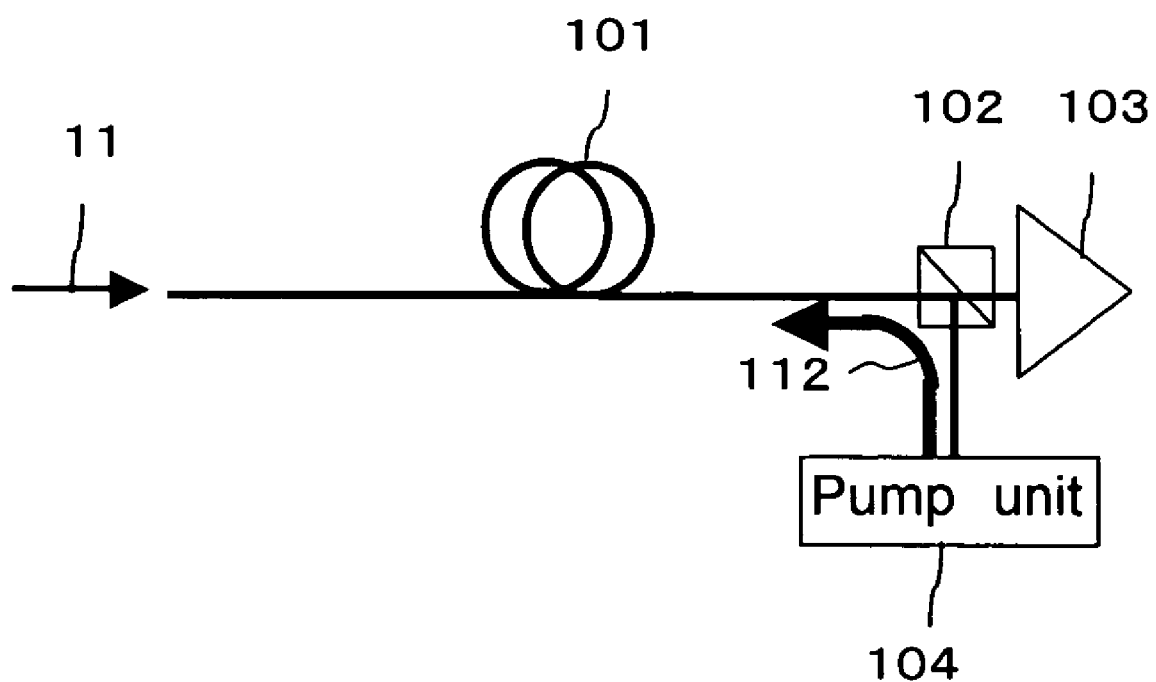
F I G. 2

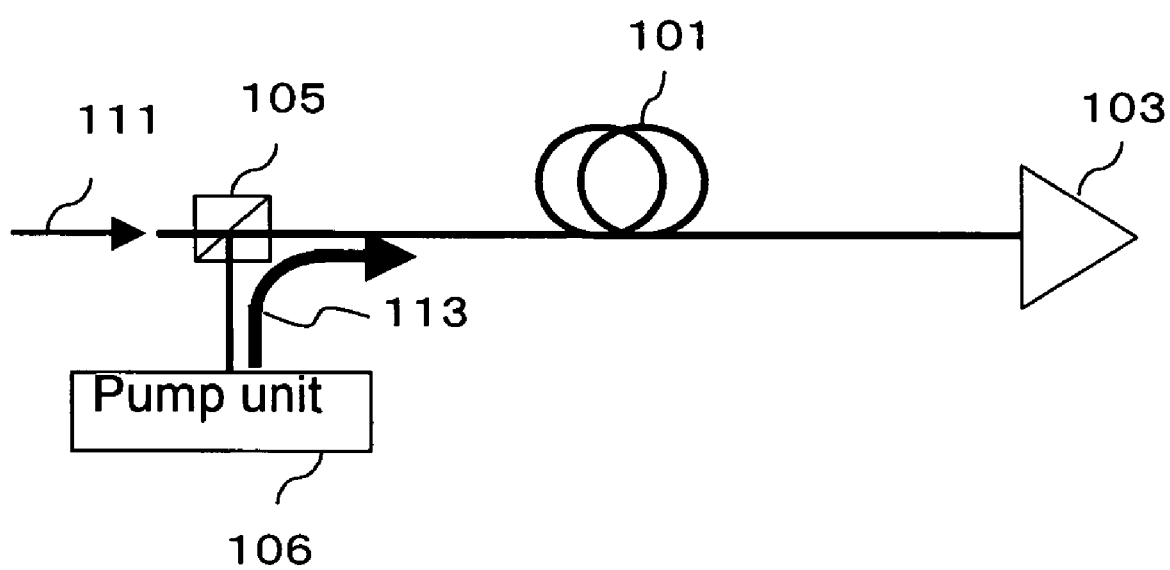
F I G. 3

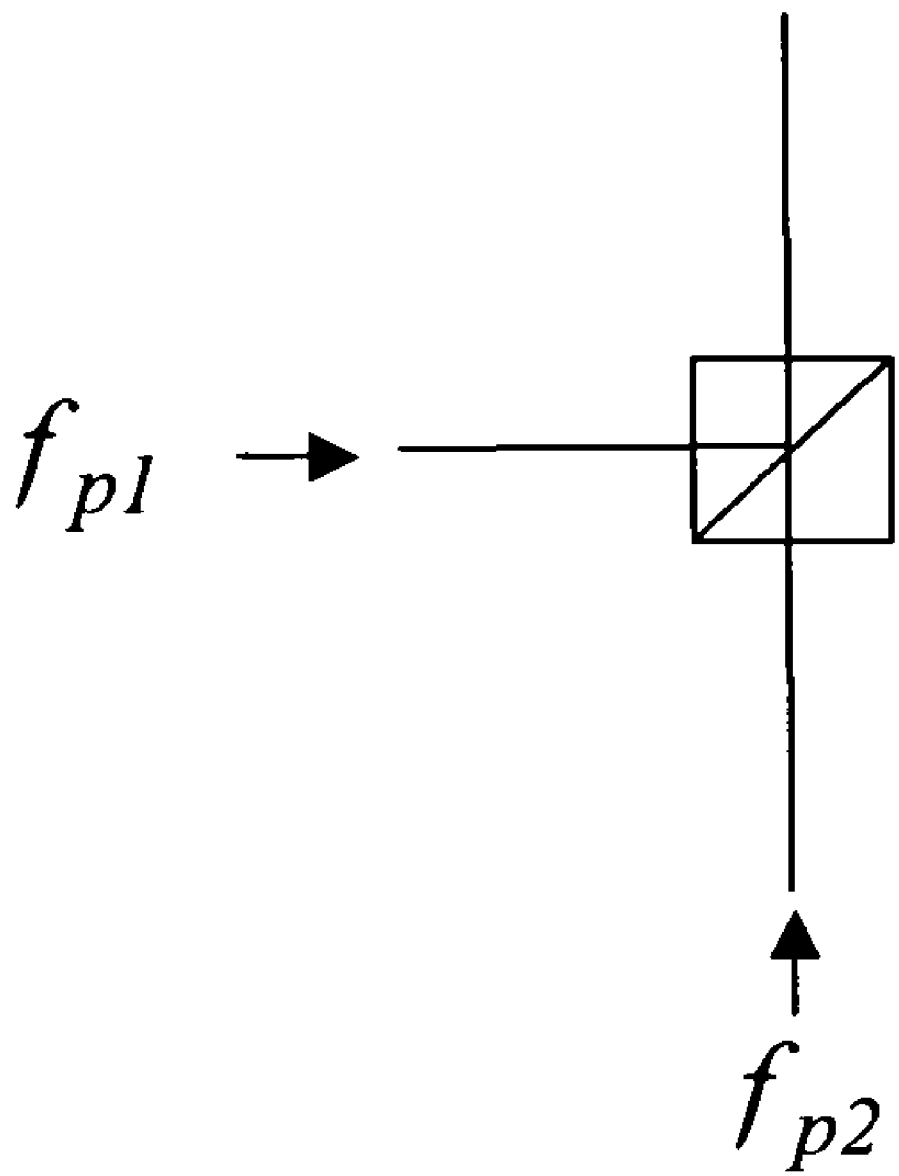
F I G. 4

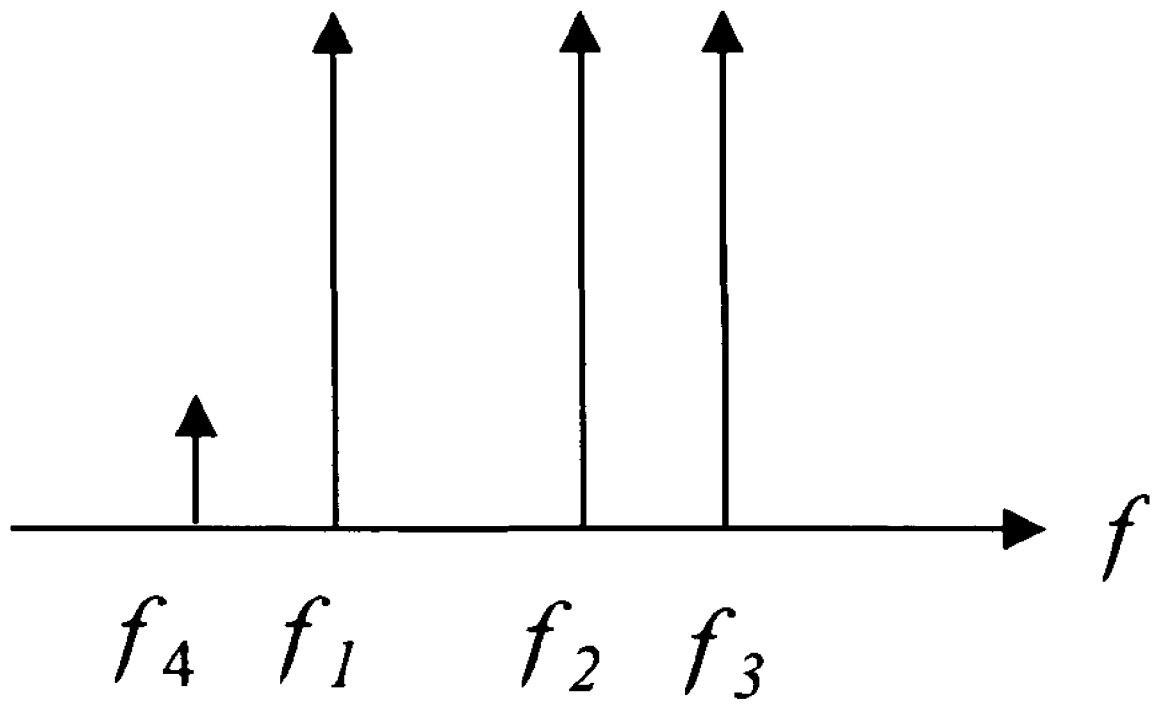
F I G. 5

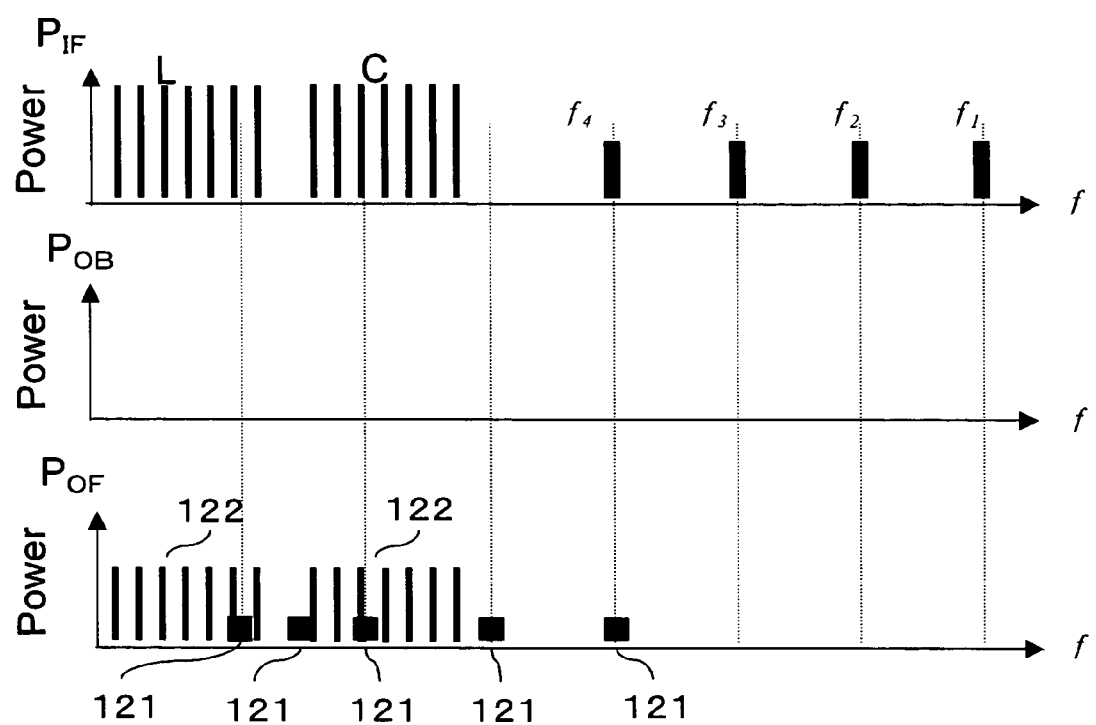
F I G. 6

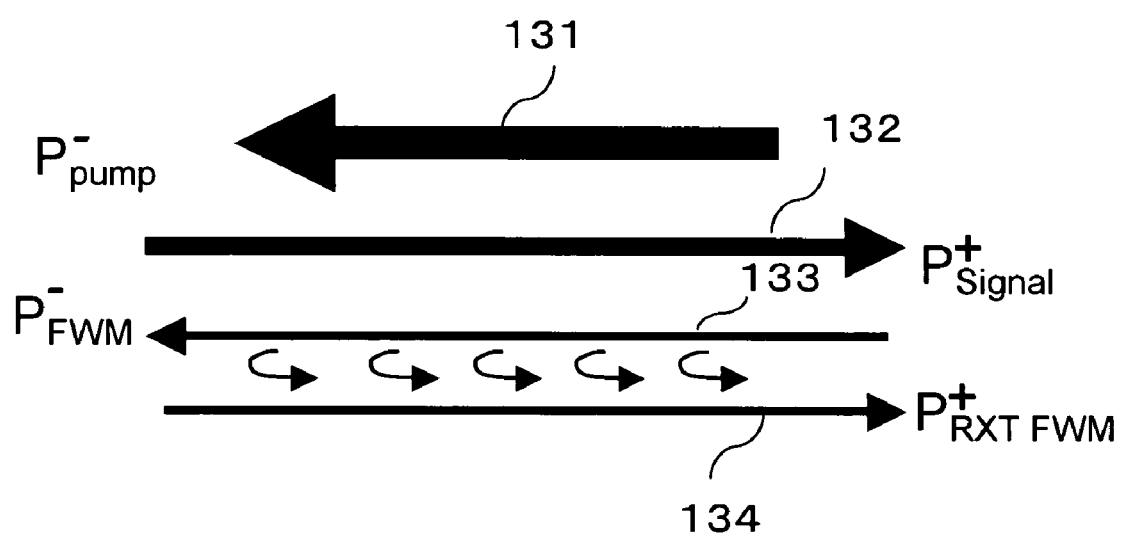
F I G. 7

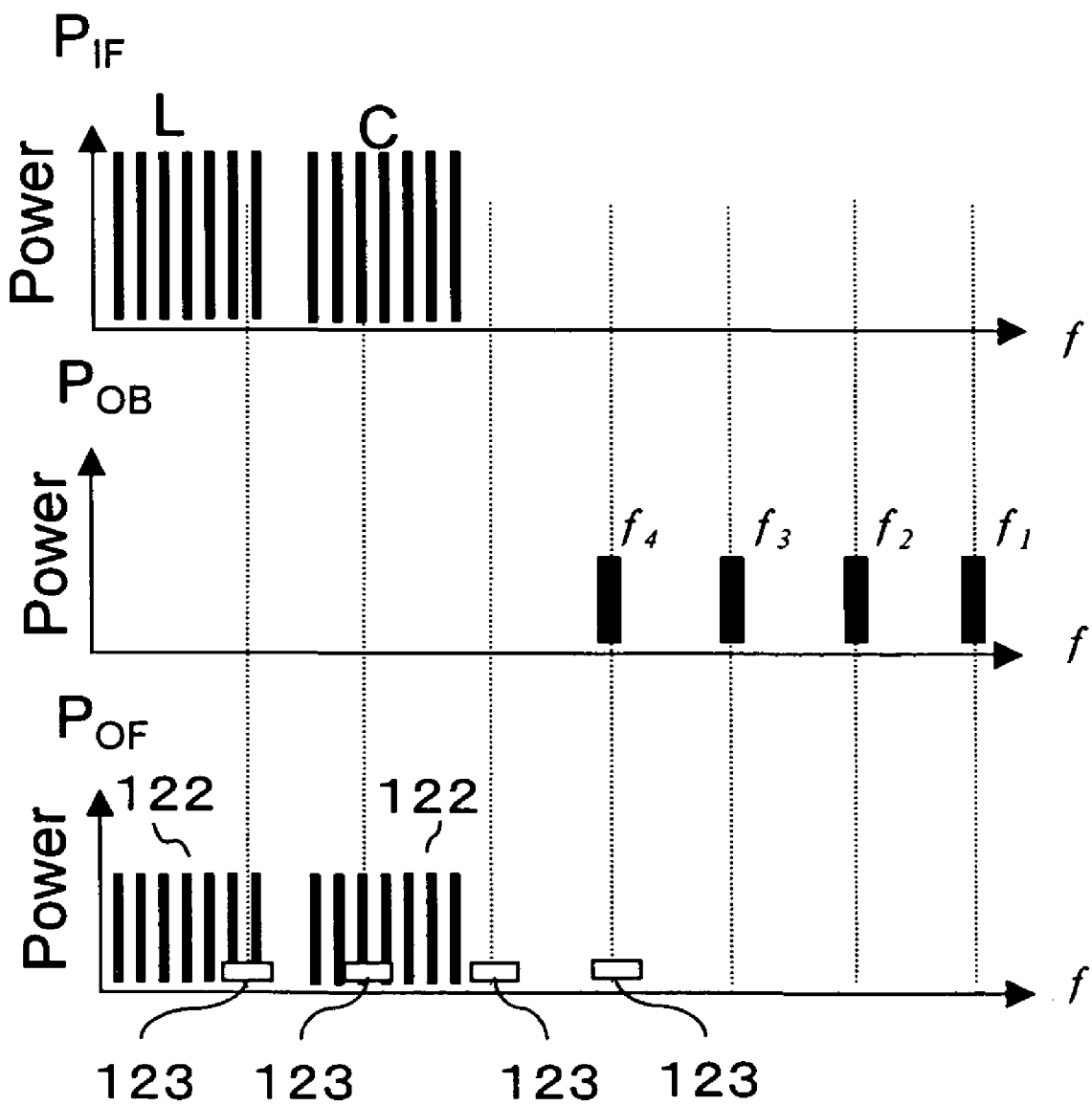
F I G. 8

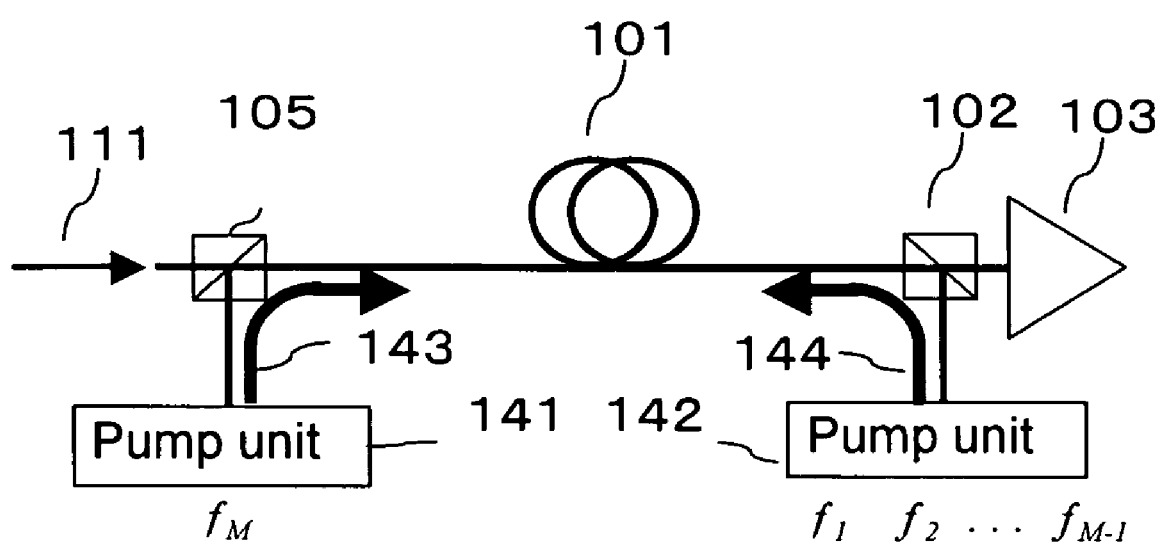
F I G. 1 0

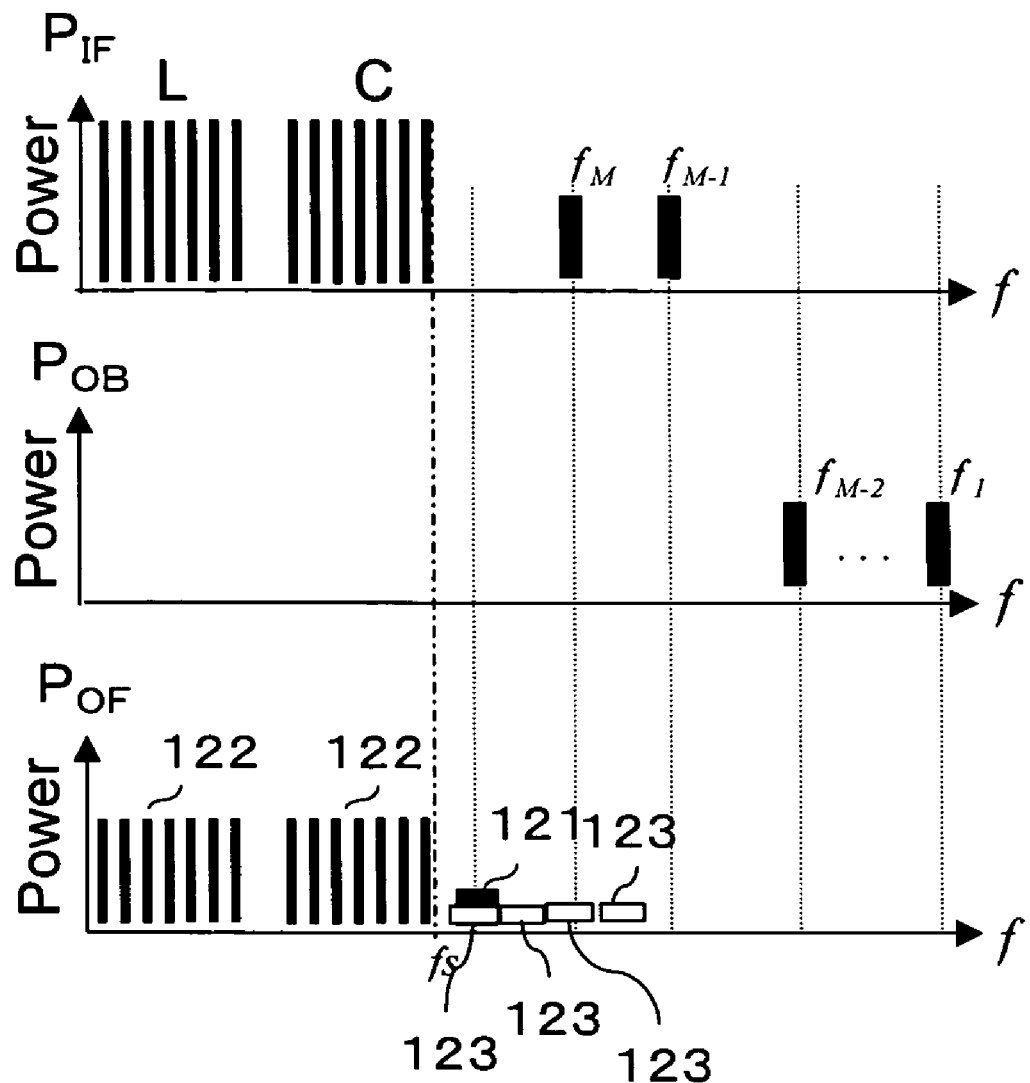
F I G. 13

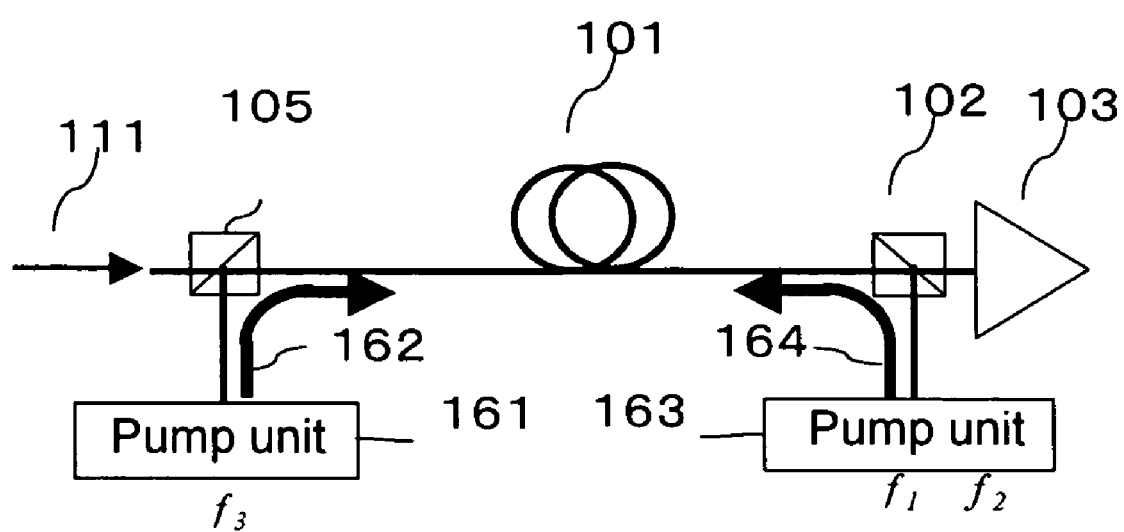
F I G. 1 4

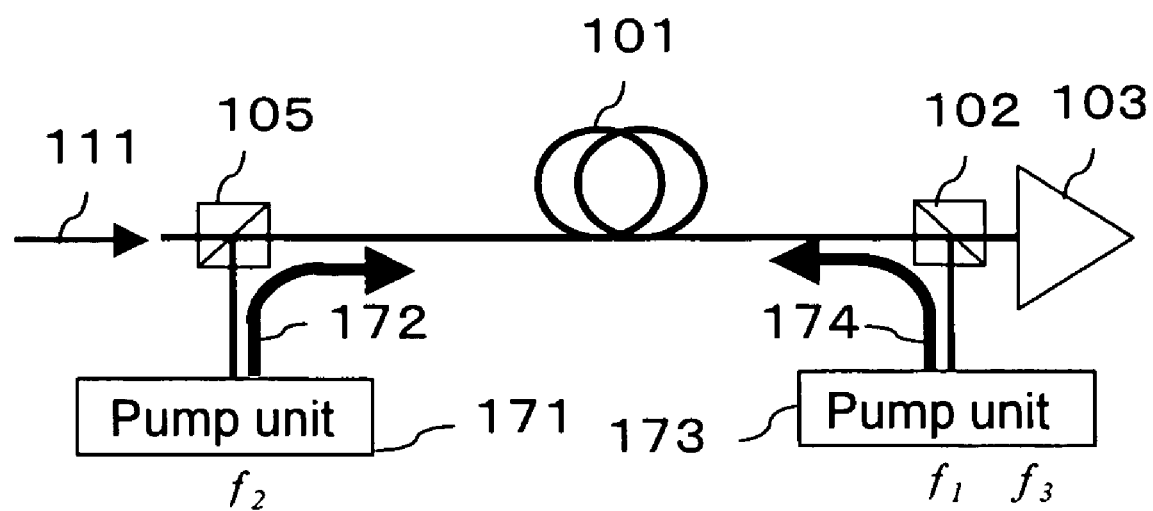
F I G. 1 6

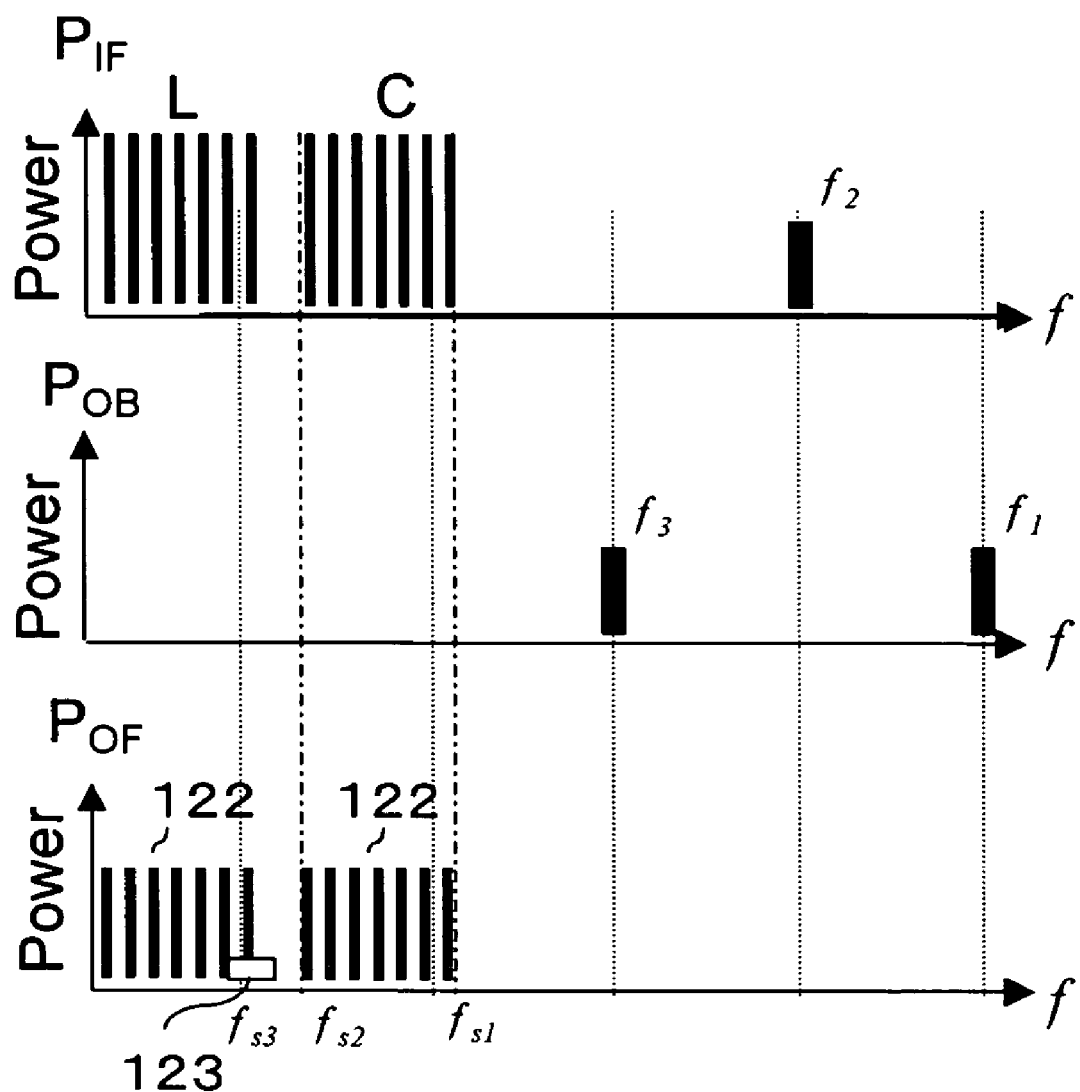
F I G. 1 7

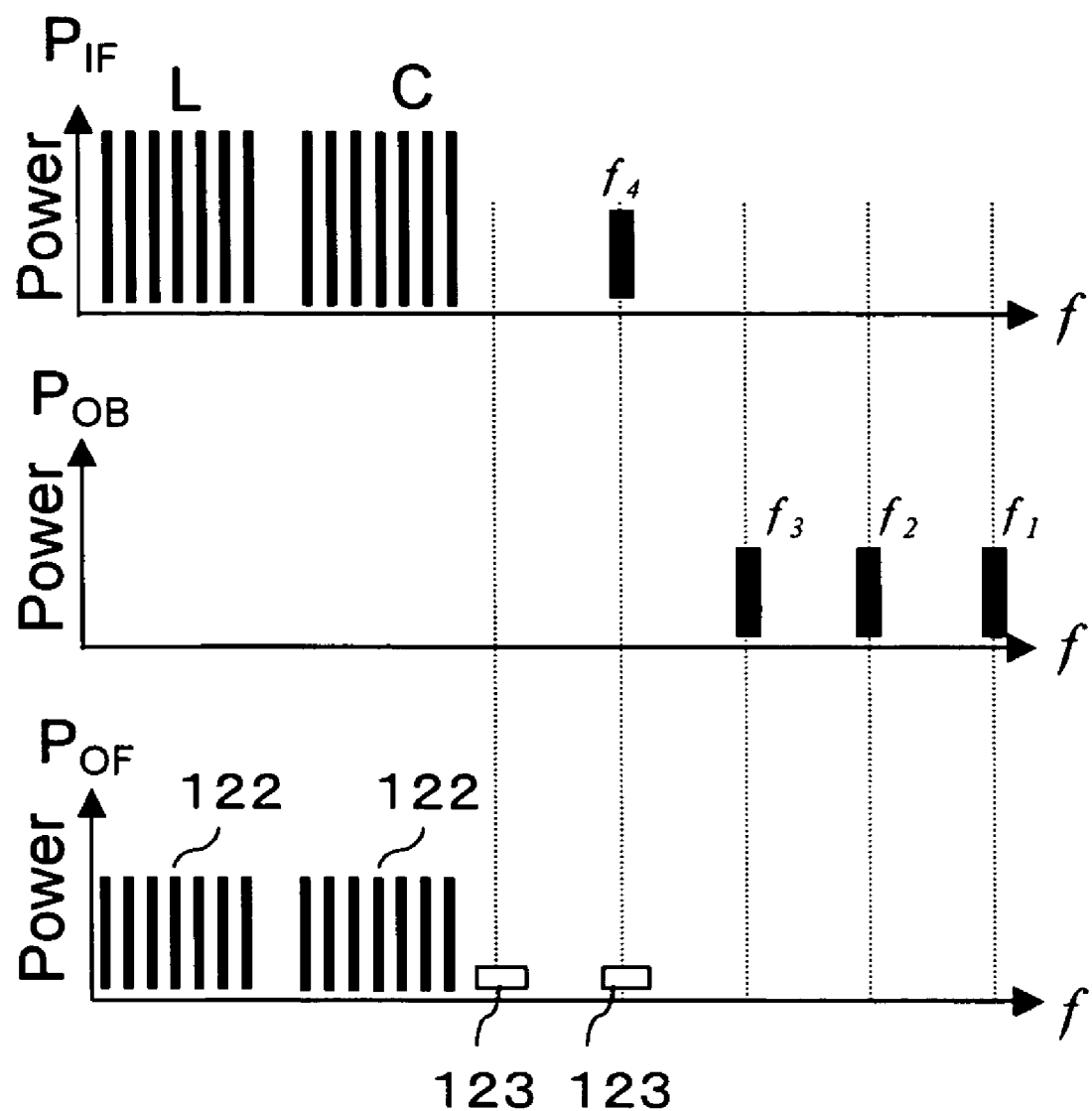
F I G. 2 1

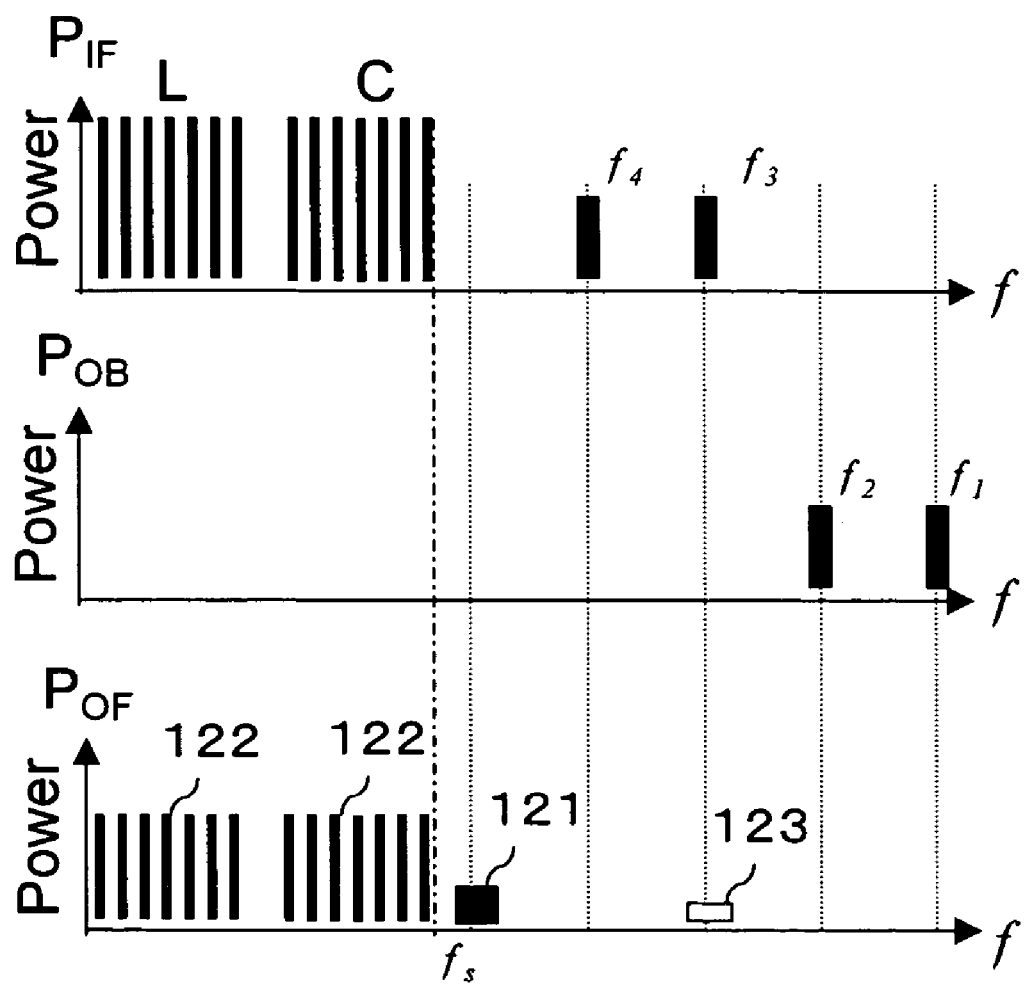
F I G. 23

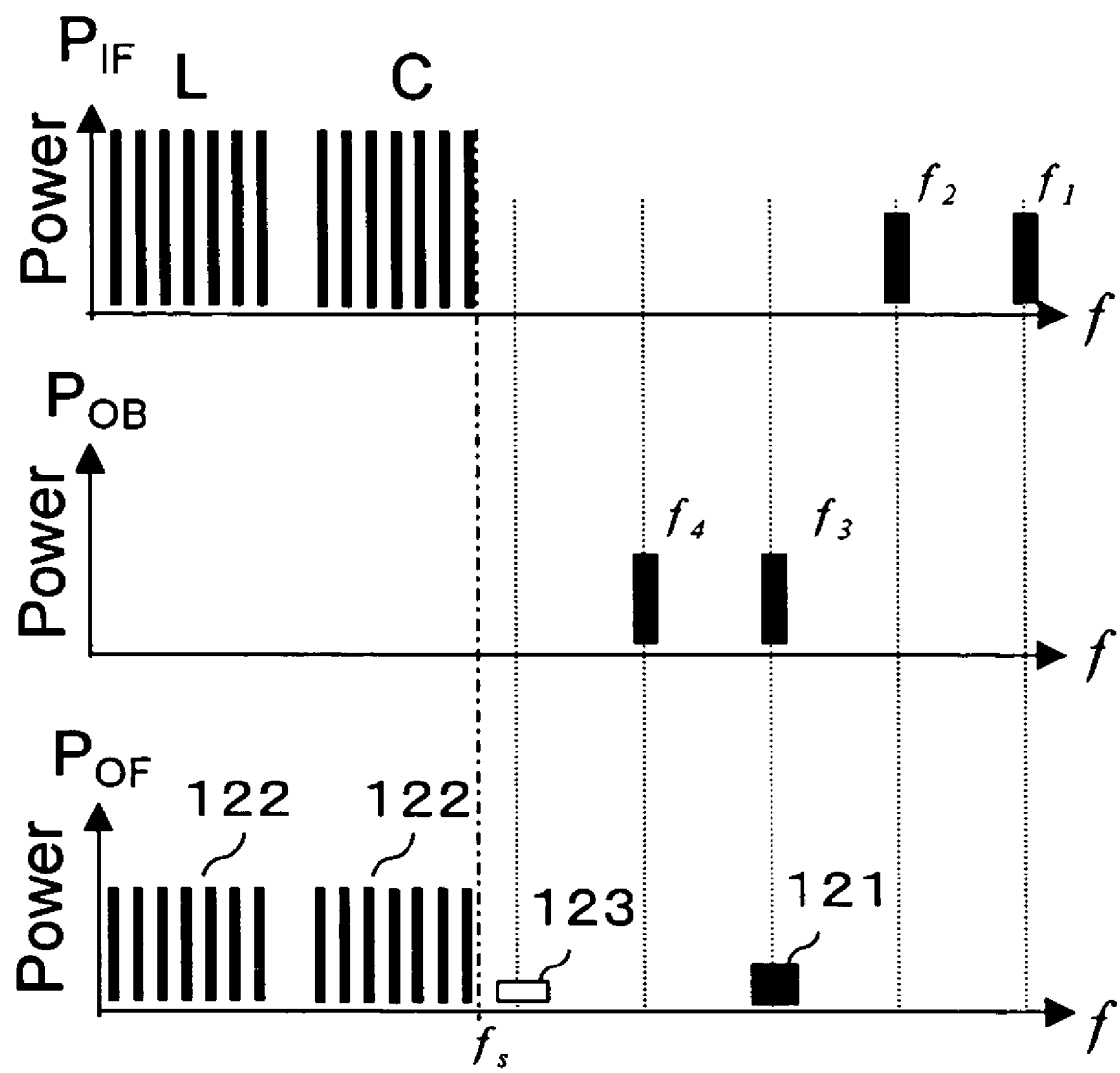
F I G. 2 5

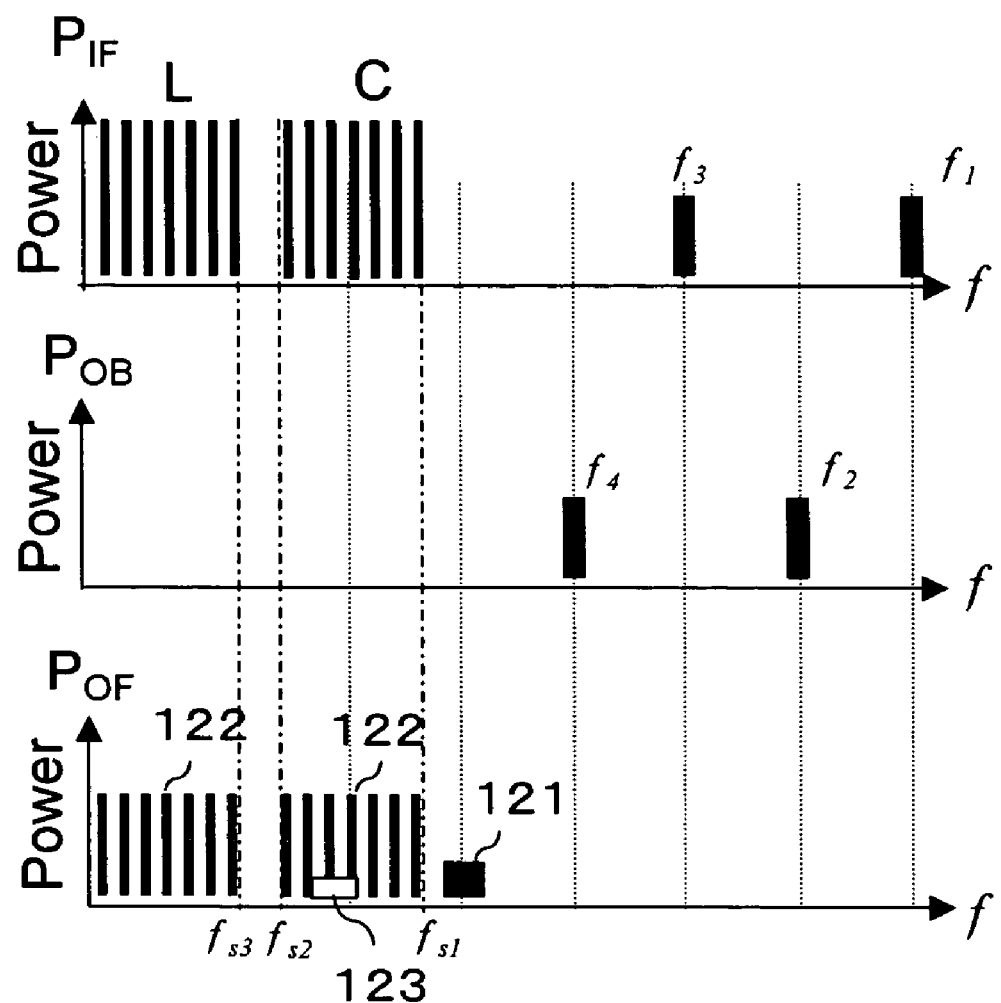
F I G. 2 7

RAMAN AMPLIFICATION SYSTEM UTILIZING BI-DIRECTIONAL PUMPING

CROSS REFERENCE TO RELATED APPLICATION

This application is a continuation of international PCT application No. PCT/JP02/05959 filed on Jun. 14, 2002.

BACKGROUND OF THE INVENTION

1. Field of the Invention

The present invention relates to a Raman amplified optical communication system utilizing bi-directional Raman amplification with Raman pump wavelengths and directions designed to suppress crosstalk caused by four-wave mixing (FWM) among the Raman pumps.

2. Description of the Related Art

State-of-the-art wavelength division multiplexed (WDM) optical fiber transmission systems employ distributed Raman amplification (DRA) in addition to discrete amplifiers in repeater units. DRA partly compensates fiber losses along the transmission fiber and thus allows increasing the distance between discrete amplifiers or repeater units. DRA is based on stimulated Raman scattering, an inelastic scattering process between photons and optical phonons in which optical power is transferred from shorter to longer wavelengths.

FIG. 1 shows a typical Raman gain profile (Raman gain spectrum). The maximum power transfer occurs between wavelengths separated by 13.3 THz (about 100 nm in the 1550 nm region). Two pumping arrangements can be distinguished, as shown in FIG. 2 and FIG. 3.

FIG. 2 shows counter-directional pumping, where the pump light 112 propagates in opposite direction to the signal light (signal waves) 111 in a transmission fiber 101. In this case, a discrete amplifier 103 and a pump unit 104 are provided in a repeater unit on one side (output side) of the transmission fiber 101 and coupled to the transmission fiber 101 through an optical coupler 102. The pump unit 104 comprises a plurality of pump lasers of different wavelengths.

FIG. 3 shows co-directional pumping, where the pump light 113 propagates in the same direction as the signal light 111. In this case, a pump unit 106 is provided in a repeater unit on the other side (input side) of the transmission fiber 101 and coupled to the transmission fiber 101 through an optical coupler 105.

In state-of-the art systems, counter-propagation is commonly used in order to avoid the risk of pump-signal crosstalk. Two sources of pump-signal crosstalk can be distinguished:
a) intrinsic relative intensity noise (RIN) of the pump lasers that is transferred to the signals and
b) intra-channel crosstalk, i.e. inter-symbol interference, and inter-channel crosstalk due to bit pattern dependent pump depletion (W. Jiang and P. Ye, "Crosstalk in Fiber Raman Amplification for WDM Systems", Journal of Lightwave Technology, vol. 7, pp. 1407–1411, September 1989).

U.S. patent application 2001/0036004 A1 disclosed a method for the reduction of the first type of crosstalk in configurations with co-propagating pumps. The second type of crosstalk can be suppressed by choosing the co-propagating pump wavelength such that its group velocity differs from that of the signals. If the walk-off between signal and pump is sufficiently high, the effect of the bit pattern dependent pump depletion averages out.

Employing a plurality of pumps of different wavelengths with suitable power allows a flat gain over a wide signal wavelength region as required in broadband WDM transmission systems (Y. Emori and S. Namiki, "100 nm bandwidth flat gain Raman amplifiers pumped and gain-equalized by 12-wavelength-channel WDM high power laser diodes", Optical Fiber Communication Conference 1999, Technical Digest PD19/1-PD19/3 Suppl.).

Since the Raman pumping efficiency is polarization sensitive it is necessary to depolarize the pump light in order to suppress polarization dependent gain. Depolarization can be achieved by multiplexing two waves with orthogonal polarization of the same or of slightly different frequencies $f_{p1}$, $f_{p2}$ given by $f_{p1}=f_p-\delta f_p$, $f_{p2}=f_p+\delta f_p$, where $\delta f_p$ is up to 0.35 THz, as shown in FIG. 4. Later on, the term "depolarized pump" will be used for such pairs of multiplexed waves with slightly different frequencies and orthogonal polarization. As frequency of a depolarized pump the center frequency $f_p$ is used.

Four-wave mixing (FWM) (Optical Fiber Telecommunications IIIA, Academic Press, Kaminov and Koch, chapter 8, pp. 212–225, 1997) is a nonlinear process induced by the Kerr effect in optical fibers. If three signals at frequencies $f_1$, $f_2$, and $f_3$ co-propagate through a single mode fiber, light at a frequency $f_4=f_1+f_2-f_3$ will be generated as shown in FIG. 5. The FWM power depends on
a) the optical frequencies, the optical input powers and the polarization states (Kyo Inoue, "Polarization effect on four-wave mixing efficiency in a single-mode fiber", IEEE Journal of Quantum Electronics, Vol. 28, No. 4, pp. 883–894, 1992) of the three mixing waves, and
b) the dispersion, the nonlinear and the loss characteristics of the fiber.

The case $f_1=f_2$ is referred to as "degenerate" FWM. The efficiency of FWM strongly depends on the phase matching between the four interacting waves, which can be expressed by the phase matching parameter $$\Delta\beta = \beta_3 + \beta_4 - \beta_1 - \beta_2$$
$$= \frac{\pi c^2}{f_0^4} S[(f_1 - f_0) + (f_2 - f_0)](f_1 - f_3)(f_2 - f_3)$$

where $\beta_j$ (j=1, 2, 3, 4) are the propagation constants of the four waves, and c the light velocity and $f_0$ the zero-dispersion frequency and S the dispersion slope ($S=dD_c/d\lambda$) of the fiber. The FWM efficiency is highest in the case of phase matching ($\Delta\beta=0$) which occurs if $f_1$ and $f_2$ are symmetrically allocated around $f_0$.

FWM has been mainly recognized as a limiting factor among signal channels. However, FWM among pump lights can also affect the transmission performance in fibers with the zero dispersion wavelength in the pump wavelength region, as has been pointed out by Neuhauser et al. (R. E. Neuhauser, P. M. Krummrich, H. Bock, and C. Glingener, "Impact of nonlinear pump interactions on broadband distributed Raman amplification", Optical Fiber Communication Conference 2001, Technical Digest MA4/1–MA4/3). Depending on the wavelength allocation of the Raman pump lights and the signal wavelengths, the FWM products of the Raman pumps can fall into the signal wavelength range, where they undergo Raman amplification. Thus, in the case of co-propagating pumping as shown in FIG. 3, these FWM products cause crosstalk with the signals.

FIG. 6 shows spectra in the co-propagating pumping scheme where pump light of frequencies $f_1$, $f_2$, $f_3$, and $f_4$ co-propagates in the same direction as L-band and C-band signal waves (forward direction). $P_{IF}$, $P_{OB}$, and $P_{OF}$ respectively represent a spectrum of forward propagating light at fiber input, a spectrum of backward propagating light at fiber output, and a spectrum of forward propagating light at fiber output. As illustrated, FWM products 121 appear at fiber output and cause crosstalk with the signal waves 122.

In the counter-propagating pumping scheme, the FWM products of the Raman pumps do not directly crosstalk with the signals. However, due to Rayleigh backscattering, a small part of the light is reflected into the opposite direction as shown in FIG. 7. When pump light 131 couter-propagating in opposite direction to signals 132 generates FWM products 133, light of the products is partially Rayleigh backscattered and generates backscattered FWM products 134, which again undergo Raman amplification and give rise to crosstalk with the signals 132.

FIG. 8 shows spectra in the counter-propagating pumping scheme shown in FIG. 2, where pump light of frequencies $f_1$, $f_2$, $f_3$, and $f_4$ counter-propagates in opposite direction to the L-band and C-band signal waves (backward direction). In this case, pump light appears in $P_{OB}$ and generates Rayleigh backscattered FWM products 123 in $P_{OF}$, which cause crosstalk with the signal waves 122.

Thus, a method is required to suppress FWM among Raman pumps in fibers with the zero dispersion wavelength in the pump wavelength region.

SUMMARY OF THE INVENTION

It is an object of the present invention to provide a Raman amplification system with suppressed FWM among Raman pumps in an optical communication system.

FWM is suppressed if one of the three interacting waves propagates in opposite direction to the others. Therefore, the number of FWM products originating from a plurality of Raman pumps can be substantially reduced by changing the propagation direction of a part of the pumps.

In the first aspect of the present invention, the Raman amplification system comprises a first and a second pump unit and amplifies signal light propagating in an optical fiber by Raman amplification with a plurality of pumps. The first pump unit outputs pump light of a part of the plurality of pumps which propagates in same direction as the signal light and the second pump unit outputs pump light of a remaining part of the plurality of pumps which propagates in opposite direction to the signal light. Propagation directions of wavelengths of the plurality of pumps are chosen such that FWM products among the wavelengths are minimized in a wavelength region of the signal light.

According to such a bi-directional Raman pumping scheme, FWM among pump wavelengths is minimized in the signal wavelength region by choosing the propagation direction of each of the pump wavelengths appropriately.

In the second aspect of the present invention, the Raman amplification system comprises a pump unit and an optical coupler and amplifies signal light propagating in an optical fiber by Raman amplification with a plurality of pumps. The pump unit outputs pump light of a part of the plurality of pumps which co- and counter-propagate to the signal light. Propagation directions of wavelengths of the plurality of pumps are chosen such that FWM products among the wavelengths are minimized in a wavelength region of the signal light. The optical coupler supplies the pump light output from the pump unit to the optical fiber.

According to such a system for bi-directional Raman pumping, FWM among pump wavelengths is minimized in the signal wavelength region as in the system of the first aspect of the present invention.

In the third aspect of the present invention, the Raman amplification system comprises a pump unit and an optical coupler and amplifies signal light propagating in an optical fiber by Raman amplification. The pump unit outputs pump light and wavelengths of the pump light are chosen such that FWM products among the wavelengths occur in a gap between adjacent signal bands of the signal light. The optical coupler supplies the pump light output from the pump unit to the optical fiber.

According to such a system, FWM among pump wavelengths is suppressed since it occurs outside the signal bands and eliminated from them.

BRIEF DESCRIPTION OF THE DRAWINGS

FIG. 1 shows a typical Raman gain spectrum;
FIG. 2 shows a counter-propagating pumping scheme;
FIG. 3 shows a co-propagating pumping scheme;
FIG. 4 shows a depolarized pump;
FIG. 5 shows four-wave mixing;
FIG. 6 shows spectra in a co-propagating pumping scheme;
FIG. 7 shows Rayleigh backscattering of four-wave mixing products;
FIG. 8 shows spectra in a counter-propagating pumping scheme;
FIG. 10 shows a configuration of the first M-pump system;
FIG. 13 shows spectra in the second M-pump system;
FIG. 14 shows a configuration of the first three-pump system;
FIG. 16 shows a configuration of the second three-pump system;
FIG. 17 shows spectra in the second three-pump system;
FIG. 21 shows spectra in the first four-pump system;
FIG. 23 shows spectra in the second four-pump system;
FIG. 25 shows spectra in the third four-pump system;
FIG. 27 shows spectra in the fourth four-pump system.

DESCRIPTION OF THE PREFERRED EMBODIMENTS

Figure 9:
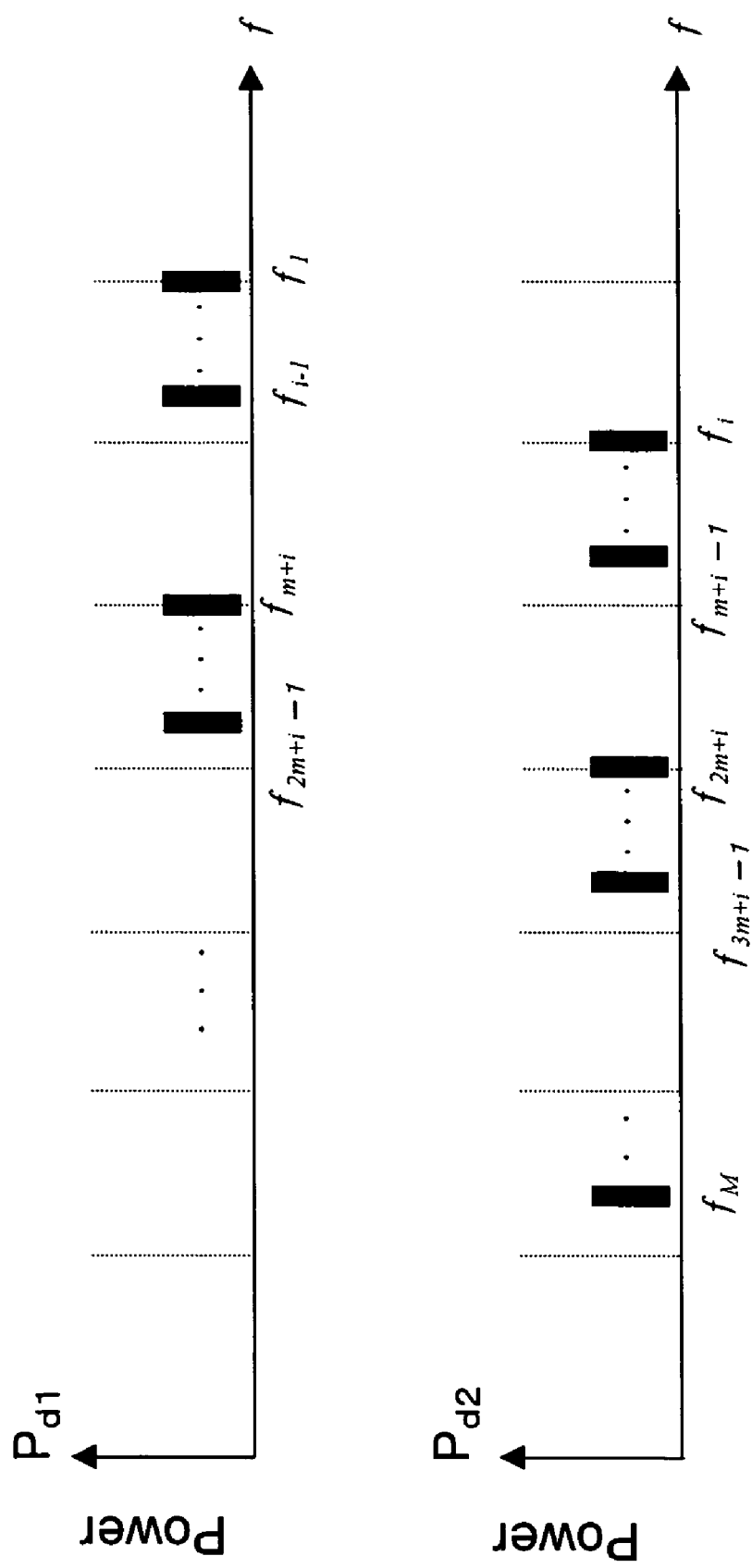
FIG. 9 shows an interleaved bi-directional pumping.

Hereinafter, preferred embodiments according to the present invention will be described in detail by referring to the drawings.

FWM among Raman pumps can be reduced by wavelength interleaved bi-directional Raman pumping as shown in FIG. 9 since the number of possible combinations of co-propagating pumps is reduced. $P_{d1}$ and $P_{d2}$ respectively represent a spectrum of pump waves propagating in one direction in a transmission fiber and a spectrum of pump waves propagating in the opposite direction. In general, the direction of the j-th of M pumps is forward if dir=Int[((j−i)/m) mod 2] is 1 and backward if dir=0, where m (m=1, 2, 3, ... ) is the number of neighboring pumps propagating in the same direction and i the number of the pump at which the first change of direction occurs. Int[X] represents the integer part of X and Y mod 2 represents the remainder of Y/2. The parameters m and i are chosen in order to minimize the impact of FWM among Raman pumps on the transmission of the signals.

In the following, the preferred embodiments for a certain number of Raman pumps will be disclosed. Note that a depolarized pump consist of two orthogonal waves of slightly different frequencies $f_{p1}=f_p-\delta f_p$ and $f_{p2}=f_p+\delta f_p$. Thus, the FWM products of depolarized pumps are located in the frequency interval $[f_4-\delta f_1-\delta f_2-\delta f_3, f_4+\delta f_1+\delta f_2+\delta f_3]$, where $2\delta f_1$, $2\delta f_2$, and $2\delta f_3$ are the frequency separations between the orthogonal waves of each depolarized pump. For the sake of simplicity depolarized pumps will be referred to as "pumps" in the following description. The spectral allocation of waves will be specified in terms of frequencies (f) as well as in terms of wavelengths ($\lambda$). Frequency and wavelength are related by $f=c/\lambda$.

The transmission systems described below are unidirectional, i.e. all signals propagate in the same direction, which is referred to as forward direction. Pumps co-propagating with the signals can cause significantly more pump-signal crosstalk than pumps counter-propagating to signals. Thus, it is preferable to keep the number of pumps co-propagating with signals small.

First, M-pump systems are discussed. In a system in which all M pumps counter-propagate to the signals, i.e. in backward direction, backscattered and Raman amplified inter-pump FWM products can cause crosstalk in the signal bands. By propagating the pump closest to the signals in opposite direction to the other pumps, it does not give rise to FWM.

Figure 11:
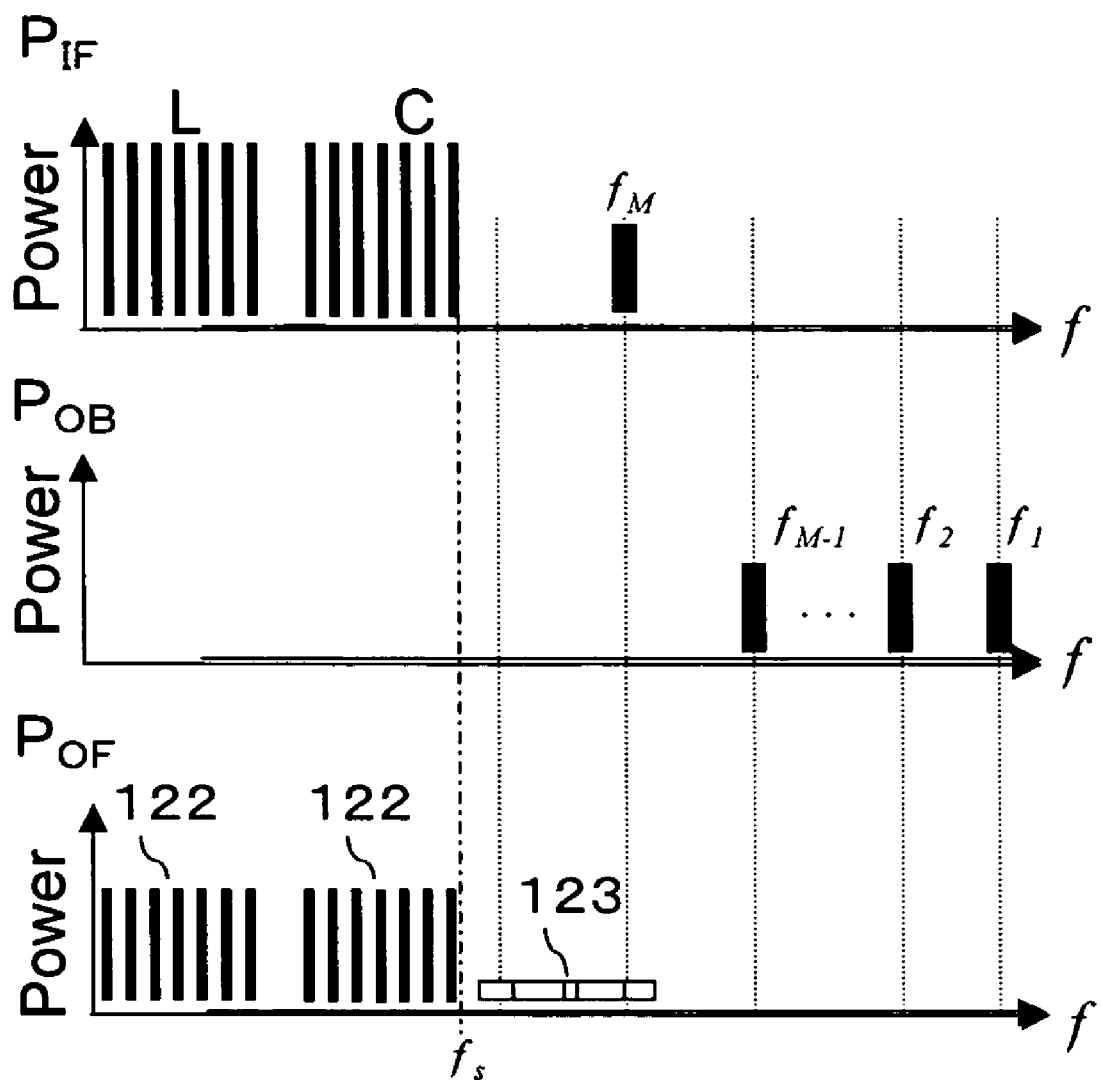
FIG. 11 shows spectra in the first M-pump system.

FIGS. 10 and 11 respectively show an optical fiber transmission system and spectra in such a bi-directional Raman pumping scheme. The pump wave 143 with the lowest frequency $f_M$ of $f_1$ through $f_M$ from a pump unit 141 propagates forward and the remaining pump waves 144 with the frequencies $f_1$ through $f_{M-1}$ from a pump unit 142 propagate backward.

If $f_{M-1}>f_0$ or $f_0>f_1$, then the zero dispersion wavelength of the fiber 101 exists outside the pump wavelength region of the backward propagating pumps and they do not affect the transmission performance. Otherwise FWM among these pumps can affect the transmission performance. The FWM products of the backward propagating pumps will occur at higher frequencies compared to the case when all pumps propagate forward. The FWM product of the lowest frequency $f_{FWM,min}$ originates from degenerate FWM between the shortest and the longest backward pump wavelength, i.e. $f_{FWM,min}=2f_{M-1}-f_1-2\delta f_{M-1}-\delta f_1$. Thus, allocating $f_{M-1}$ and $f_1$ such that $2f_{M-1}-f_1>f_s+2\delta f_{M-1}+\delta f_1$ ($f_{FWM,min}>f_s$) where $f_s$ is the highest signal frequency (shortest signal wavelength), eliminates all FWM products in the signal bands 122 and generates backscattered FWM products 123 with higher frequencies.

Figure 20:
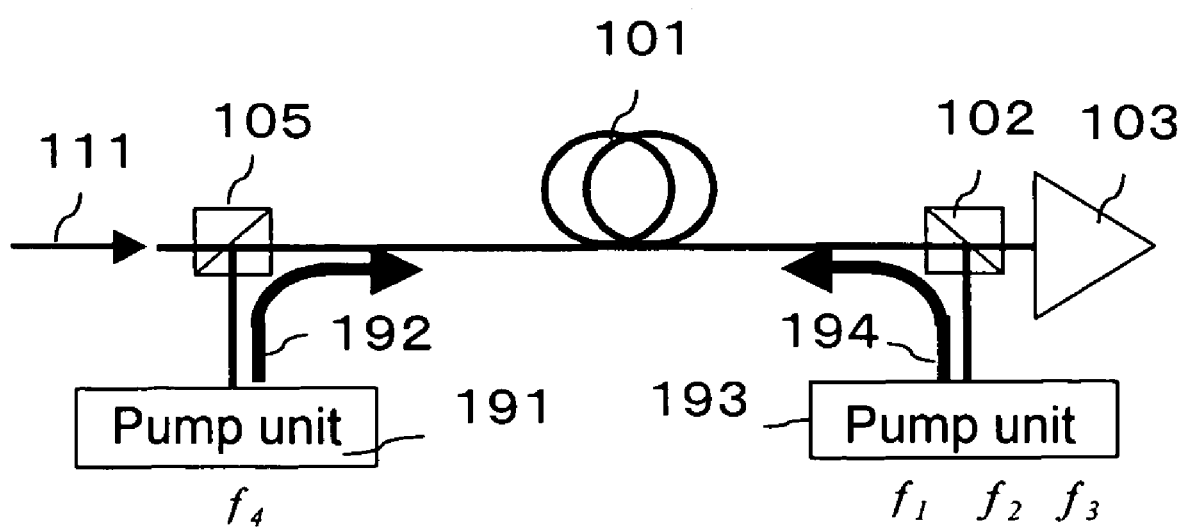
FIG. 20 shows a configuration of the first four-pump system.
Figure 28:
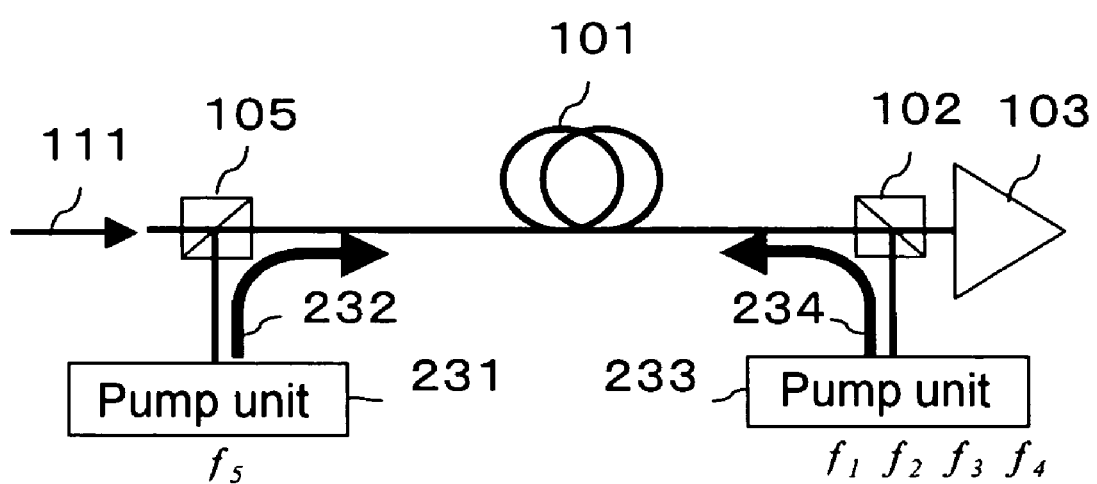
FIG. 28 shows a configuration of the first five-pump system.

FIGS. 14, 20, and 28 show the corresponding configurations for three, four and five (M=3, 4, 5) depolarized pumps, respectively.

If the frequency range between $f_{M-1}$ and $f_1$ is still larger than the frequency separation $f_{M-1}-f_s$ between the pump M-1 and the shortest signal wavelength, i.e. $f_1-f_{M-1}>f_{M-1}-f_s$, then $f_s>f_{FWM,min}$ and FWM products occur in the signal band. If, on the other hand, the frequency separation between the two longer wavelength pumps M-1 and M is smaller than the separation between pump M and the shortest signal wavelength, i.e. $f_{M-1}-f_M<f_M-f_s$, then there is a possibility that co-propagating pumps M-1 and M in forward direction does not give rise to FWM products in the signal band.

Figure 12:
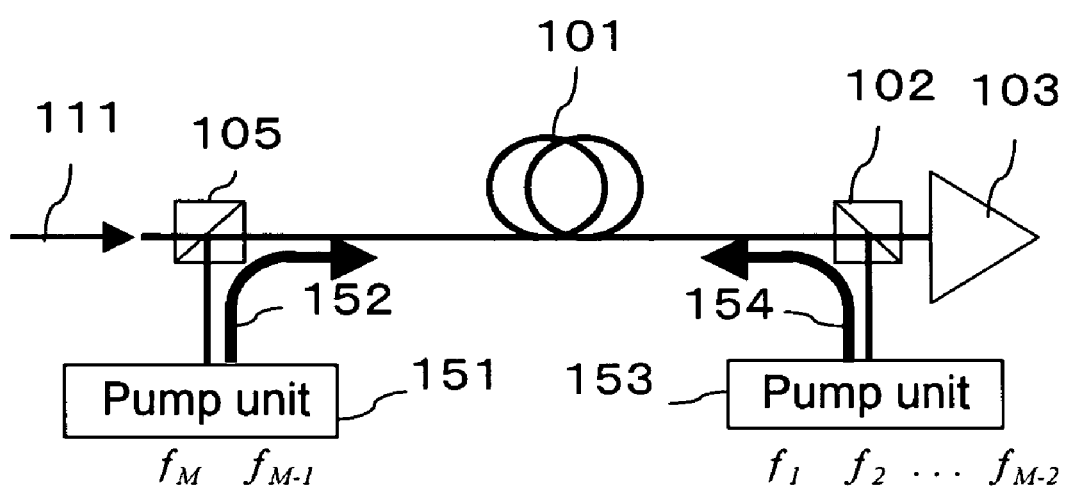
FIG. 12 shows a configuration of the second M-pump system.

FIGS. 12 and 13 respectively show an optical fiber transmission system and spectra in such a bi-directional Raman pumping scheme. The pump waves 152 with the frequencies $f_M$ and $f_{M-1}$ from a pump unit 151 propagate forward and the remaining pump waves 154 with the frequencies $f_1$ through $f_{M-2}$ from a pump unit 153 propagate backward. The lowest frequency FWM product of the forward propagating pumps M and M-1 originates from degenerate FWM between these pump wavelengths, i.e. $f_{FWM,min}=2f_M-f_{M-1}-2\delta f_M-\delta f_{M-1}$. Thus, allocating $f_M$ and $f_{M-1}$ such that $2f_M-f_{M-1}>f_s+2\delta f_M+\delta f_{M-1}$ ($f_{FWM,min}>f_s$) eliminates all FWM products in the signal bands 122 and generates FWM products 121 with higher frequencies.

If $f_{M-2}>f_0$ or $f_0>f_1$, then the backward propagating pumps do not affect the transmission performance, otherwise they do. The lowest frequency FWM product of the backward pumps 1 to M-2 originates from degenerate FWM between the shortest and the longest backward pump wavelength, i.e. $f_{FWM,min}=2f_{M-2}-f_1-2\delta f_{M-2}-\delta f_1$. Thus, allocating $f_{M-2}$ and $f_1$ such that $2f_{M-2}-f_1>f_s+2\delta f_{M-2}+\delta f_1$ ($f_{FWM,min}>f_s$) eliminates all FWM products in the signal bands 122 and generates backscattered FWM products 123 with higher frequencies.

Figure 22:
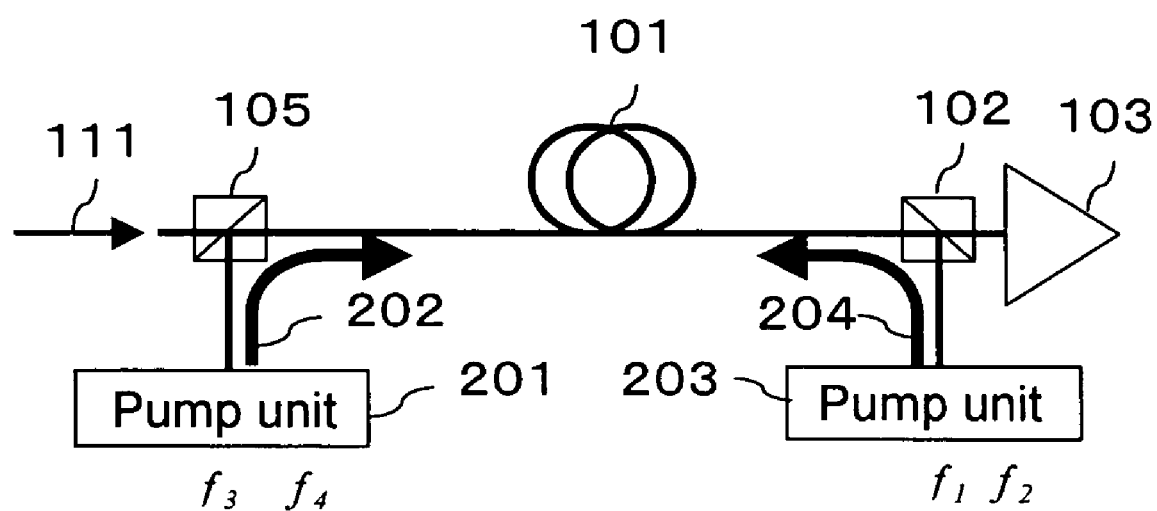
FIG. 22 shows a configuration of the second four-pump system.
Figure 30:
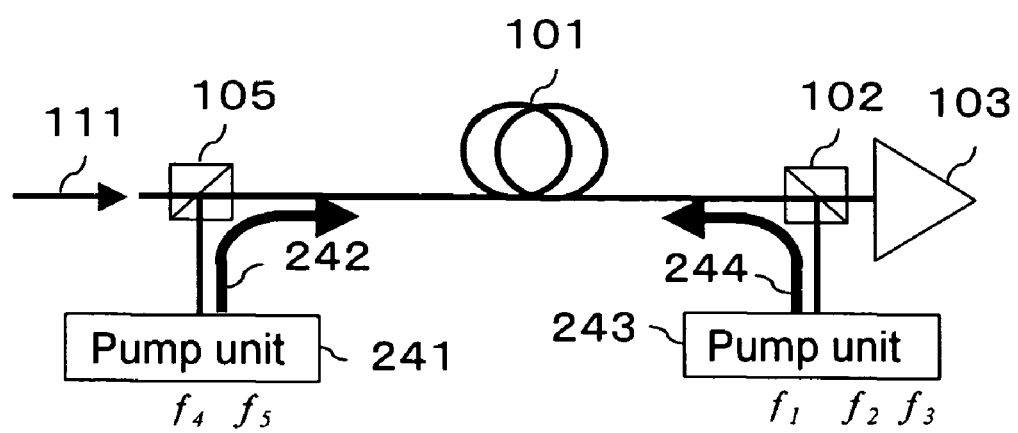
FIG. 30 shows a configuration of the second five-pump system.

FIGS. 22 and 30 show the corresponding configurations for four and five depolarized pumps (M=4,5), respectively.

Next, three-pump systems are discussed. Propagating one of three pumps in forward direction reduces the number of FWM products in a three-pump system.

Figure 15:
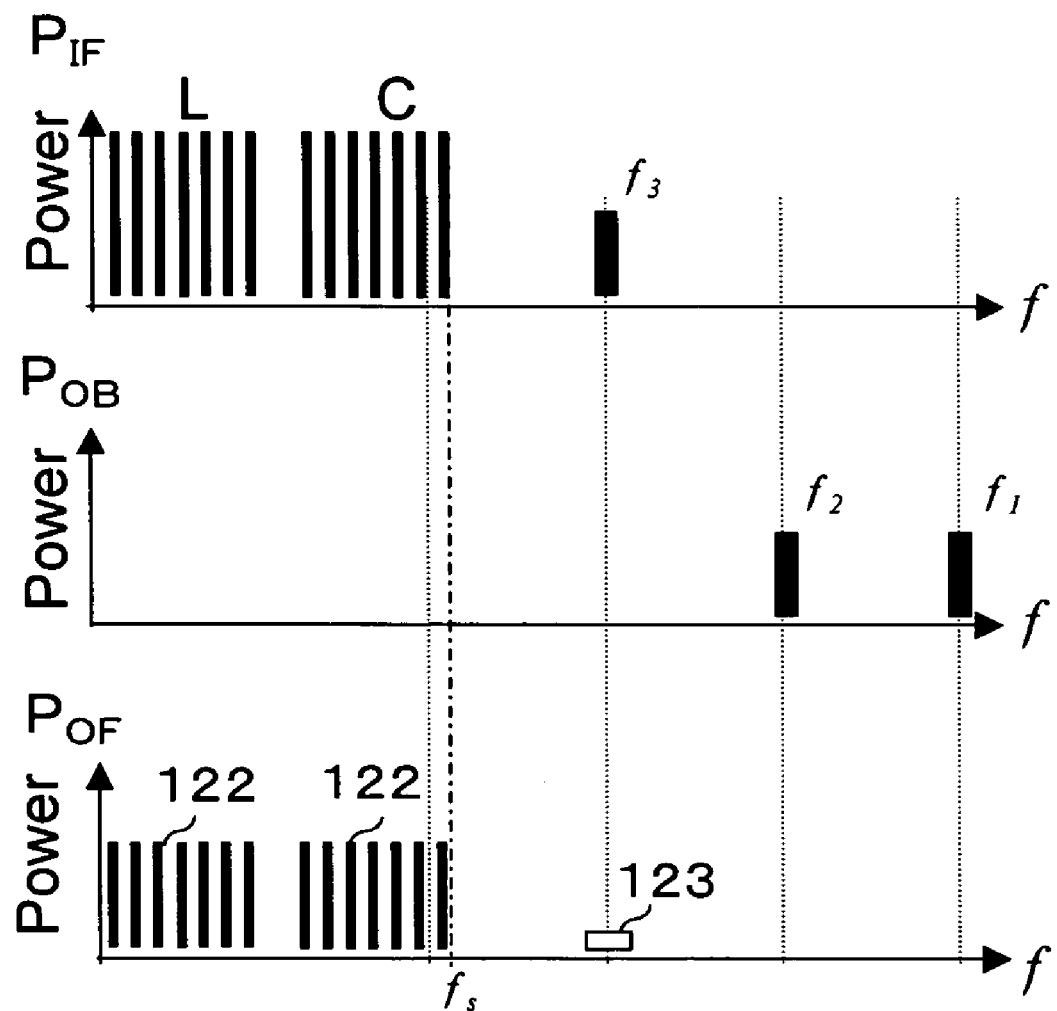
FIG. 15 shows spectra in the first three-pump system.

FIG. 14 shows a configuration in which the longest pump wavelength propagates in forward direction. The pump wave 162 with the lowest frequency $f_3$ Of $f_1$ through $f_3$ from a pump unit 161 propagates forward and the remaining pump waves 164 with the frequencies $f_1$ and $f_2$ from a pump unit 163 propagate backward. Spectra in such a three-pump system are as shown in FIG. 15.

If $f_2>f_0$ or $f_0>f_1$, then the backward propagating pumps do not affect the transmission performance. Otherwise allocating $f_2$ and $f_1$ such that $2f_2-f_1>f_s+2\delta f_2+\delta f_1$ ($f_{FWM,min}=2f_2-f_1-2\delta f_2-\delta f_1>f_s$) generates a backscattered FWM product 123 in a frequency range above the signal bands 122.

FIG. 16 shows another three-pump system in which the shortest and the longest pump wavelength propagate in backward direction. The pump wave 172 with the middle frequency $f_2$ from a pump unit 171 propagates forward and the remaining pump waves 174 with the frequencies $f_1$ and $f_3$ from a pump unit 173 propagate backward. Spectra in such a three-pump system are as shown in FIG. 17.

If $f_3 > f_0$ or $f_0 > f_1$, then the backward propagating pumps do not affect the transmission performance. Otherwise their FWM in the signal range occurs at $2f_3 - f_1$ and the backscattered FWM product 123 are located in the frequency interval $[f_{FWM,min}, f_{FWM,max}] = [2f_3 - f_1 - 2\delta f_3 - \delta f_1, 2f_3 - f_1 + 2\delta f_3 + \delta f_1]$. Proper selection of these two pump frequencies allows shifting the FWM product 123 into the gap between two neighboring signal bands 122. The pump frequencies need to fulfill the following conditions: $2f_3 - f_1 < f_{s2} - 2\delta f_3 - \delta f_1$ ($f_{FWM,max} < f_{S2}$) and $2f_3 - f_1 > f_{s3} + 2\delta f_3 + \delta f_1$ ($f_{FWM,min} > f_{S3}$), where $f_{s2}$ is the frequency of the longest signal wavelength of the first signal band (C-band) and $f_{s3}$ is the frequency of the shortest signal wavelength of the second signal band (L-band), with $f_{s3} < f_{s2}$. The frequency of the shortest signal wavelength of the first signal band is denoted by $f_{s1}$ in FIG. 17.

Figure 18:
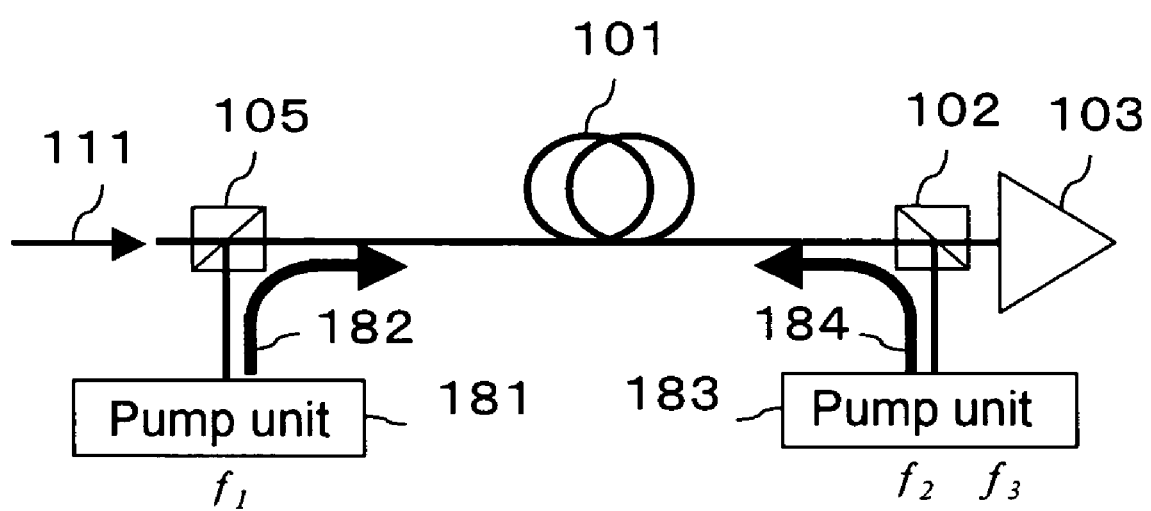
FIG. 18 shows a configuration of the third three-pump system.
Figure 19:
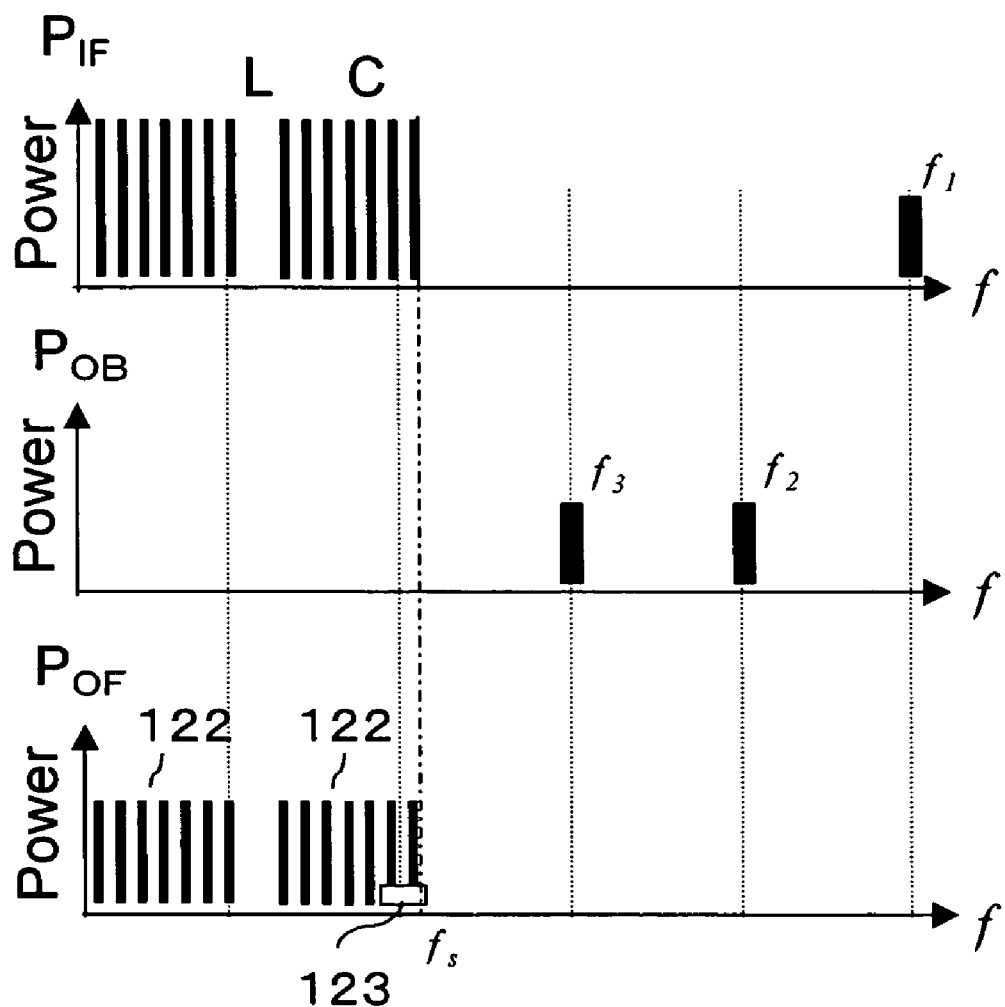
FIG. 19 shows spectra in the third three-pump system.

FIG. 18 shows the third configuration of a three-pump system, wherein the shortest wavelength pump co-propagates with the signal. The pump wave 182 with the highest frequency $f_1$ from a pump unit 181 propagates forward and the remaining pump waves 184 with the frequencies $f_2$ and $f_3$ from a pump unit 183 propagate backward. Spectra in such a three-pump system are as shown in FIG. 19.

If $f_3 > f_0$ or $f_0 > f_2$, then the backward propagating pumps do not affect the transmission performance. Otherwise frequencies $f_2$ and $f_3$ need to be selected properly. If the backward pumps 2 and 3 are allocated such that $2f_3 - f_2 > f_s + 2\delta f_3 + \delta f_2$ ($f_{FWM,min} = 2f_3 - f_2 - 2\delta f_3 - \delta f_2 > f_s$), the FWM product 123 of these pumps occurs above the frequency $f_s$ of the shortest signal wavelength.

Next, four-pump systems are discussed. FIG. 20 shows the configuration in which the longest pump wavelength propagates in forward direction. The pump wave 192 with the lowest frequency $f_4$ of $f_1$ through $f_4$ from a pump unit 191 propagates forward and the remaining pump waves 194 with the frequencies $f_1$ through $f_3$ from a pump unit 193 propagate backward. Spectra in such a four-pump system are as shown in FIG. 21.

If $f_3 > f_0$ or $f_0 > f_1$, then the backward propagating pumps do not affect the transmission performance. Otherwise allocating $f_3$ and $f_1$ such that $2f_3 - f_1 > f_s + 2\delta f_3 + \delta f_1$ ($f_{FWM,min} = 2f_3 - f_1 - 2\delta f_3 - \delta f_1 > f_s$) generates a backscattered FWM product 123 in a frequency range above the signal bands 122.

FIG. 22 shows the configuration in which the longer two pump wavelengths propagate in forward direction. The pump waves 202 with the lower frequencies $f_3$ and $f_4$ of $f_1$ through $f_4$ from a pump unit 201 propagate forward and the remaining pump waves 204 with the frequencies $f_1$ and $f_2$ from a pump unit 203 propagate backward. Spectra in such a four-pump system are as shown in FIG. 23.

It is found that the FWM product 121 of the forward pumps in the signal bands 122 is possibly eliminated if the frequency separation between the two longer pump wavelengths is less than that between the longest pump and the shortest signal wavelength, i.e. $f_3 - f_4 < f_4 - f_S$. More precisely, if the frequencies $f_3$ and $f_4$ of pump 3 and 4 are chosen such that $2f_4 - f_3 > f_s + 2\delta f_4 + \delta f_3$ ($f_{FWM,min} = 2f_4 - f_3 - 2\delta f_4 - \delta f_3 > f_s$), the FWM product 121 of these pumps will occur at a frequency higher than that of the shortest signal wavelength.

If $f_2 > f_0$ or $f_0 > f_1$, then the backward propagating pumps do not affect the transmission performance. Otherwise it is found that the backscattered FWM product 123 in the signal bands 122 is possibly eliminated if the frequency separation between the two shorter pump wavelengths is less than that between the second pump and the shortest signal wavelength, i.e. $f_1 - f_2 < f_2 - f_S$. More precisely, if the frequencies $f_1$ and $f_2$ of pump 1 and 2 are chosen such that $2f_2 - f_1 > f_s + 2\delta f_2 + \delta f_1$ ($f_{FWM,min} = 2f_2 - f_1 - 2\delta f_2 - \delta f_1 > f_s$), the backscattered FWM product 123 of these pumps occurs above the frequency of the shortest signal wavelength.

Figure 24:
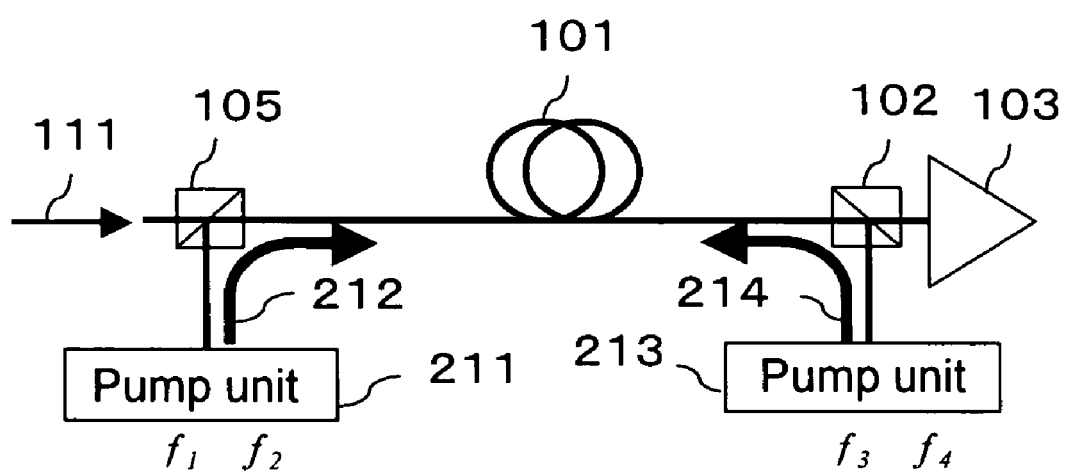
FIG. 24 shows a configuration of the third four-pump system.

FIG. 24 shows the configuration in which the two longer pump wavelengths propagate backward and the other two pumps forward. The pump waves 212 with the higher frequencies $f_1$ and $f_2$ from a pump unit 211 propagate forward and the remaining pump waves 214 with the frequencies $f_3$ and $f_4$ from a pump unit 213 propagate backward. Spectra in such a four-pump system are as shown in FIG. 25. In this case, a similar condition to that for the configuration shown in FIG. 22 holds.

If the frequencies $f_1$ and $f_2$ are chosen such that $2f_2 - f_1 > f_s + 2\delta f_2 + \delta f_1$, the FWM product 121 occurs above the frequency of the shortest signal wavelength. If $f_4 > f_0$ or $f_0 > f_3$, then the backward propagating pumps do not affect the transmission performance. Otherwise the frequencies $f_3$ and $f_4$ are chosen such that the back scattered FWM product 123 occurs above the frequency of the shortest signal wavelength, i.e. $2f_4 - f_3 > f_s + 2\delta f_4 + \delta f_3$.

Figure 26:
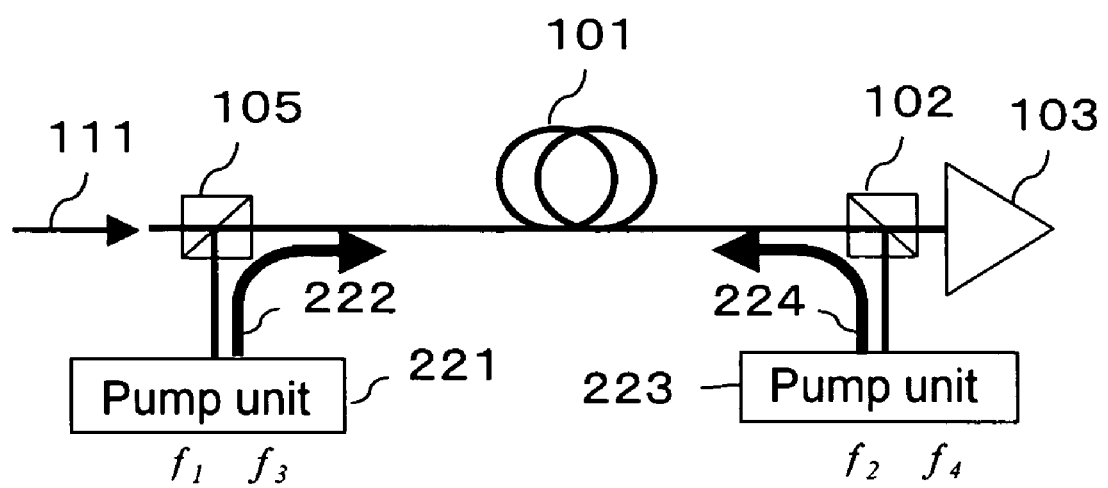
FIG. 26 shows a configuration of the fourth four-pump system.

Propagating the odd numbered pumps forward and the even numbered pumps backward causes a FWM product of pump 2 and 4 to fall into the signal band as shown in FIG. 26. The pump waves 222 with the frequencies $f_1$ and $f_3$ from a pump unit 221 propagate forward and the remaining pump waves 224 with the frequencies $f_2$ and $f_4$ from a pump unit 223 propagate backward. Spectra in such a four-pump system are as shown in FIG. 27.

The frequencies $f_1$ and $f_3$ of the forward propagating pumps 1 and 3 are chosen such that the FWM product 121 of these pumps occurs above the frequency of the shortest signal wavelength, i.e. $2f_3 - f_1 > f_{s1} + 2\delta f_3 + \delta f_1$. If $f_4 > f_0$ or $f_0 > f_2$, then the backward propagating pumps do not affect the transmission performance. Otherwise proper selection of these two pump frequencies allows shifting the backscattered FWM product 123 into the gap between two neighboring signal bands 122. The pump frequencies need to fulfill the following conditions:

$$2f_4 - f_2 < f_{s2} - 2\delta f_4 - \delta f_2 \ (f_{FWM,min} = 2f_4 - f_2 + 2\delta f_4 + \delta f_2 < f_{S2})$$
and
$$2f_4 - f_2 > f_{s3} + 2\delta f_4 + \delta f_2 \ (f_{FWM,min} = 2f_4 - f_2 - 2\delta f_4 - \delta f_2 > f_{S3}).$$

Figure 29:
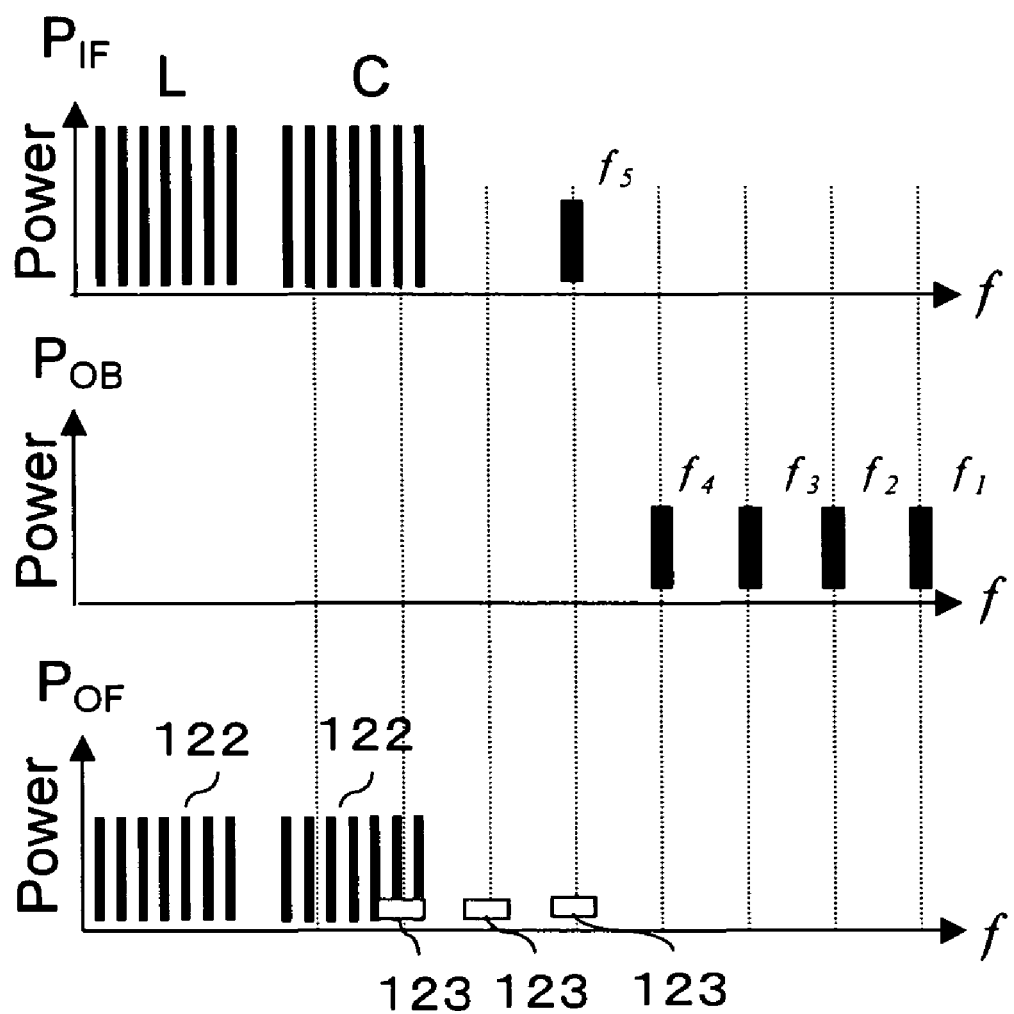
FIG. 29 shows spectra in the first five-pump system.

Next, five-pump systems are discussed. FIG. 28 shows the configuration in which the longest wavelength propagates in forward direction. The pump wave 232 with the lowest frequency $f_5$ Of $f_1$ through $f_5$ from a pump unit 231 propagates forward and the remaining pump waves 234 with the frequencies $f_1$ through $f_4$ from a pump unit 233 propagate backward. Spectra in such a five-pump system are as shown in FIG. 29.

If $f_4 > f_0$ or $f_0 > f_1$, then the backward propagating pumps do not affect the transmission performance. Otherwise allocating $f_4$ and $f_1$ such that $2f_4 - f_1 > f_s + 2\delta f_4 + \delta f_1$ ($f_{FWM,min} = 2f_4 - f_1 - 2\delta f_4 - \delta f_1 > f_s$) generates backscattered FWM products 123 in a frequency range above the signal bands 122.

Figure 31:
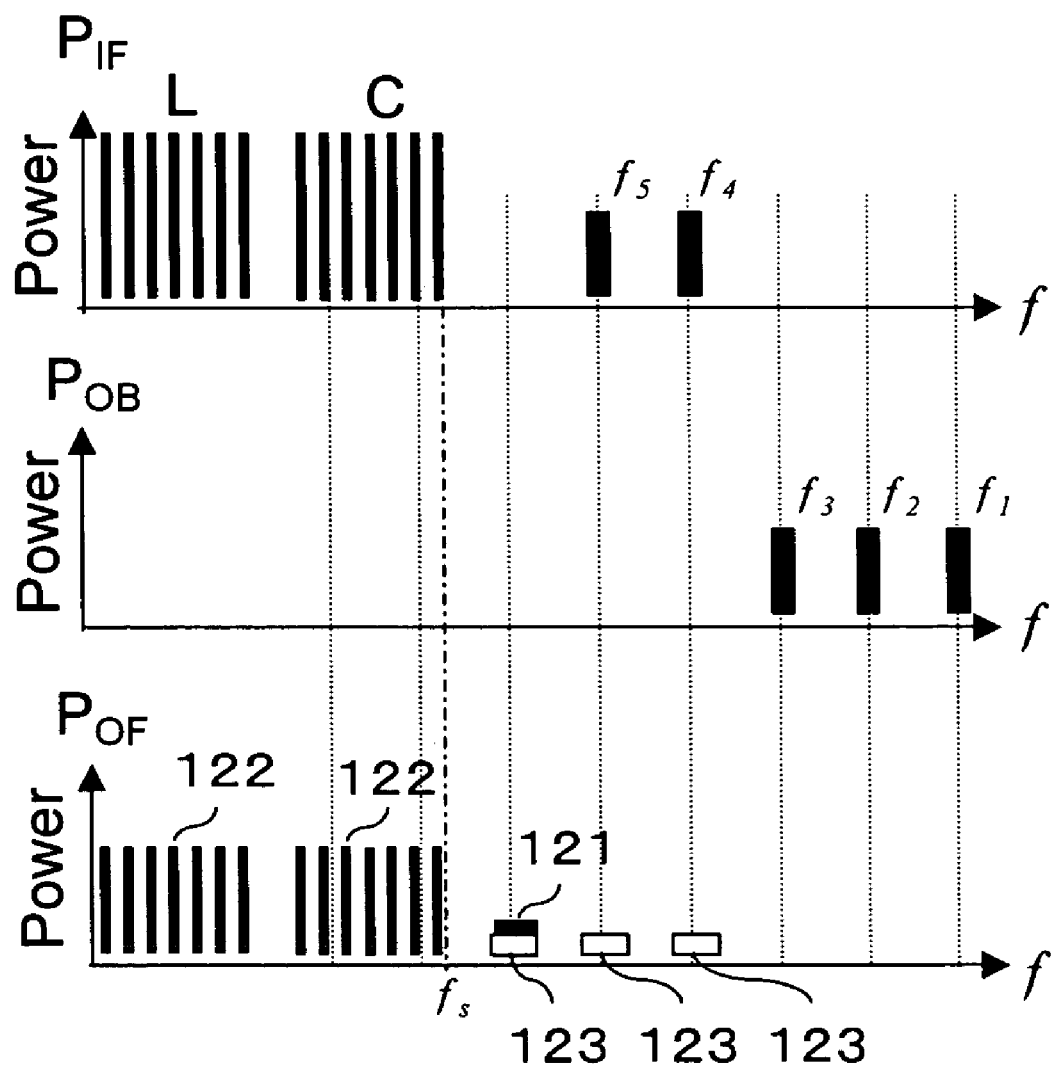
FIG. 31 shows spectra in the second five-pump system.

FIG. 30 shows the configuration in which the longer two pump wavelengths propagate in forward direction. The pump waves 242 with the lower two frequencies $f_5$ and $f_4$ from a pump unit 241 propagate forward and the remaining pump waves 244 with the frequencies $f_1$ through $f_3$ from a pump unit 243 propagate backward. Spectra in such a five-pump system are as shown in FIG. 31.

If the frequencies $f_4$ and $f_5$ of the forward propagating pump 4 and 5 are chosen such that $2f_5 - f_4 > f_s + 2\delta f_5 + \delta f_4$ ($f_{FWM,min}=2f_5-f_4-2\delta f_5-\delta f_4 > f_s$), the FWM product 121 of these pumps will occur at a frequency higher than that of the shortest signal wavelength.

If $f_3 > f_0$ or $f_0 > f_1$, then the backward propagating pumps do not affect the transmission performance. Otherwise the frequencies $f_1$ and $f_3$ of pump 1 and 3 are chosen such that the backscattered FWM products 123 of these pumps occur above the frequency of the shortest signal wavelength, i.e. $2f_3-f_1 > f_s+2\delta f_3+\delta f_1$ ($f_{FWM,min}=2f_3-f_1-2\delta f_3-\delta f_1 > f_s$).

The third configuration does not completely eliminate but considerably reduce the amount of inter-pump FWM crosstalk in the signal region. In this configuration, adjacent pumps propagate in opposite direction (interleaved bi-directional pumping), with the longest pump wavelength propagating backwards.

Figure 32:
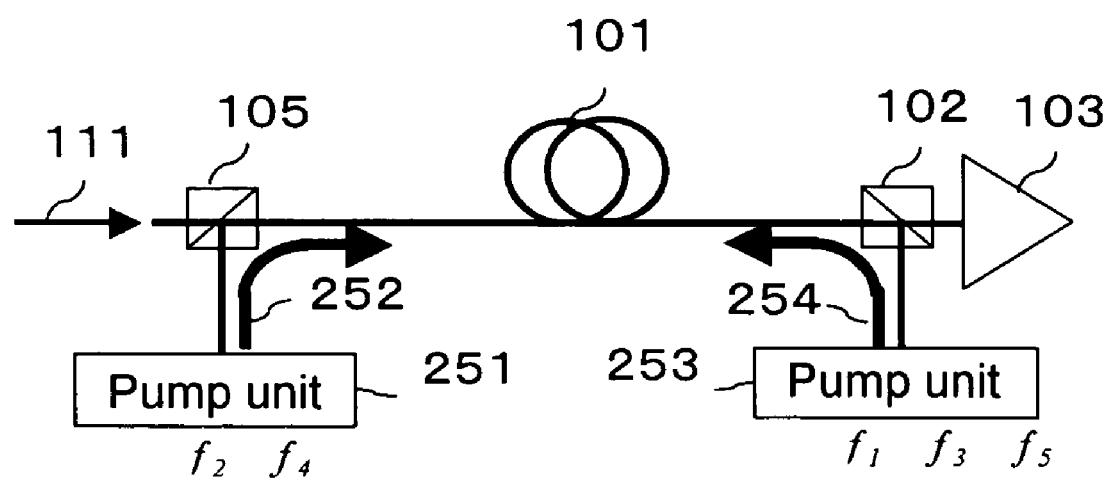
FIG. 32 shows a configuration of the third five-pump system.
Figure 33:
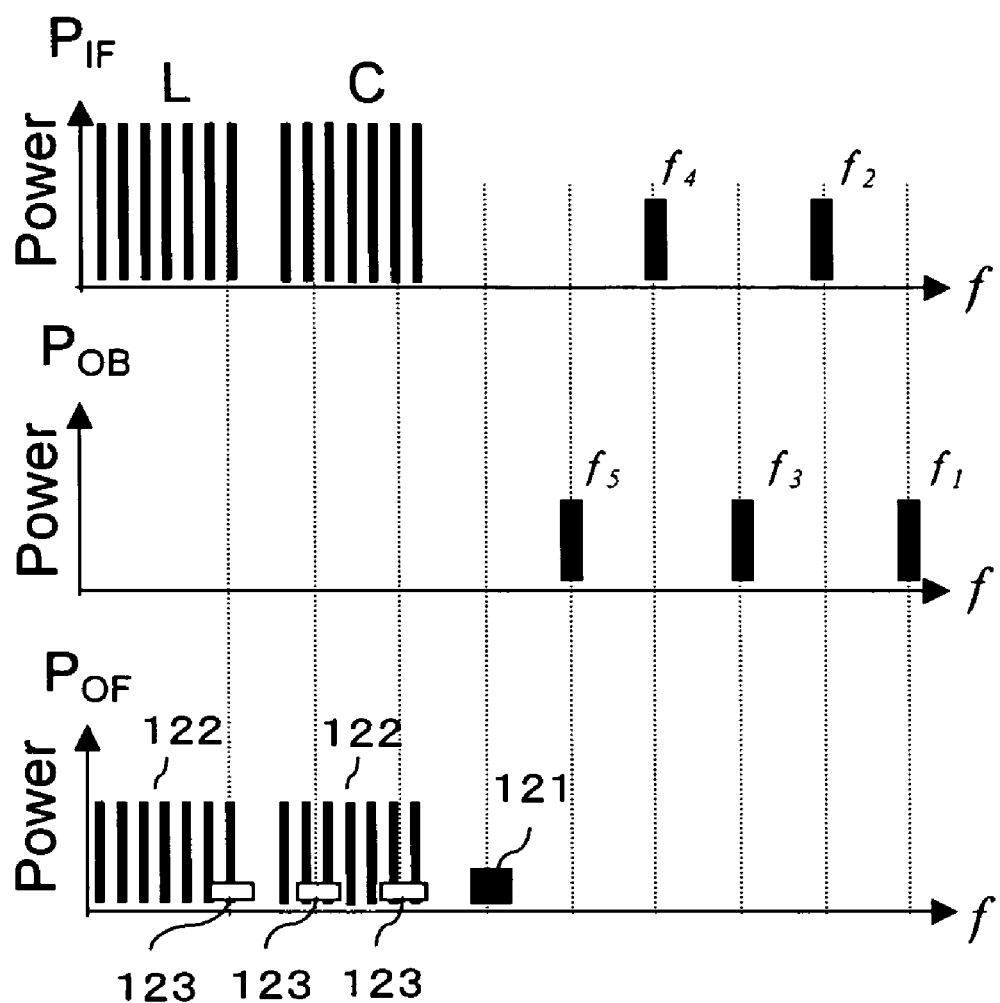
FIG. 33 shows spectra in the third five-pump system.

FIG. 32 shows the configuration in such an interleaved pumping scheme. The pump waves 252 with the two frequencies $f_2$ and $f_4$ from a pump unit 251 propagate forward and the remaining pump waves 254 with the frequencies $f_1$, $f_3$, and $f_5$ from a pump unit 253 propagate backward. Spectra in such a five-pump system are as shown in FIG. 33.

The frequencies $f_2$ and $f_4$ of the forward propagating pumps 2 and 4 are chosen such that the FWM product 121 of these pumps occurs above the frequency of the shortest signal wavelength, i.e. $2f_4-f_2 > f_s+2\delta f_4+\delta f_2$. If $f_5 > f_0$ or $f_0 > f_1$, then the backward propagating pumps do not affect the transmission performance. Otherwise they do.

In the majority of the configurations discussed so far, the FWM products in the signal wavelength region are eliminated by a proper choice of pump frequencies and propagation directions. Apart from these configurations, two configurations shown in FIGS. 16 and 26 have also been described, in which the FWM products are shifted into the wavelength interval between two neighboring signal bands. In the following this concept will be used in a more general manner. Here, the pump frequencies $f_{p,i}$ (i=1, 2) refer to the frequencies of the two orthogonal waves of a depolarized pump at center frequency $f_p$.

Figure 34:
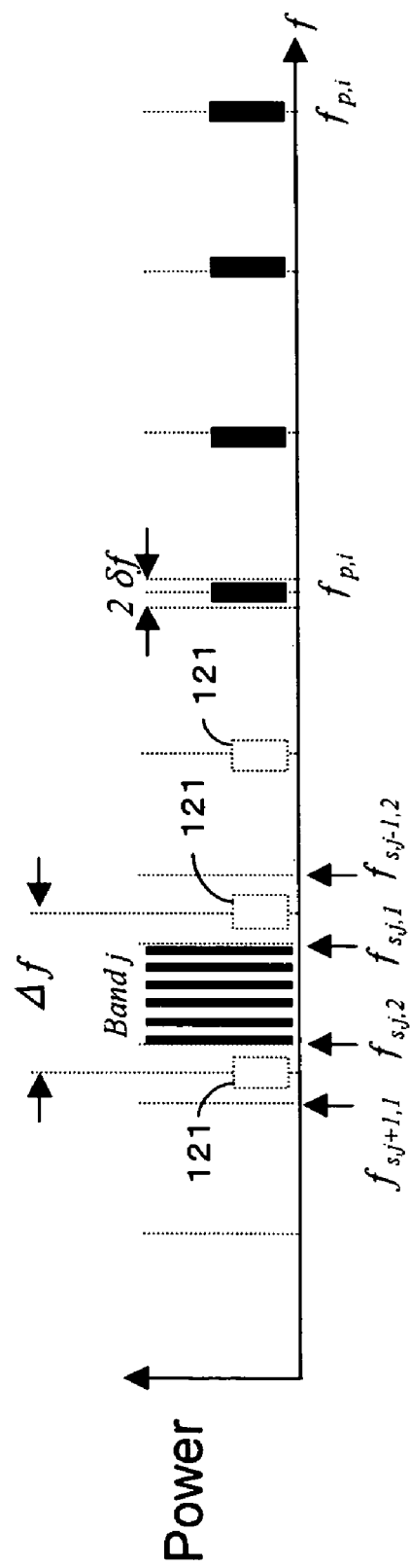
FIG. 34 shows a spectrum in allocating frequencies of co-propagating and counter-propagating pumps on a frequency grid.

Consider a frequency grid allocated at frequencies $f_{g,m}=f_{g,0}-m\Delta f$ (m=0, 1, 2, ... ) with a constant interval $\Delta f$ as shown in FIG. 34. The spectrum of backward propagating light is shown together with that of forward propagating light in FIG. 34. Signals of the j-th signal band are allocated within a frequency interval ($f_{s,j,2}$, $f_{s,j,1}$) which is located between $f_{g,m+1}$ and $f_{g,m}$. Raman pump frequencies $f_{p,1}$ and $f_{p,2}$ are allocated within frequency intervals of width $2\delta f$ around grid frequencies, i.e. within [$f_{g,m}-\delta f$, $f_{g,m}+\delta f$]. The longest and shortest wavelength FWM products of three given depolarized pumps are generated at a frequency shifted by no more than $-3\delta f$ or $+3\delta f$ from a grid frequency. Thus, $\delta f$ is chosen such that the FWM products 121 occur outside the signal bands under the condition that $|f_{s,j,2}-f_{g,m+1}| > 3\delta f$ and $|f_{g,m}-f_{s,j,1}| > 3\delta f$. Some of the FWM products 121 occur in a gap between two adjacent signal bands under this condition.

It is also considered to allocate only forward propagating pump frequencies such that the above condition is fulfilled since the FWM products of the forward propagating pumps cause more crosstalk than that of the backward propagating pumps.

Figure 35:
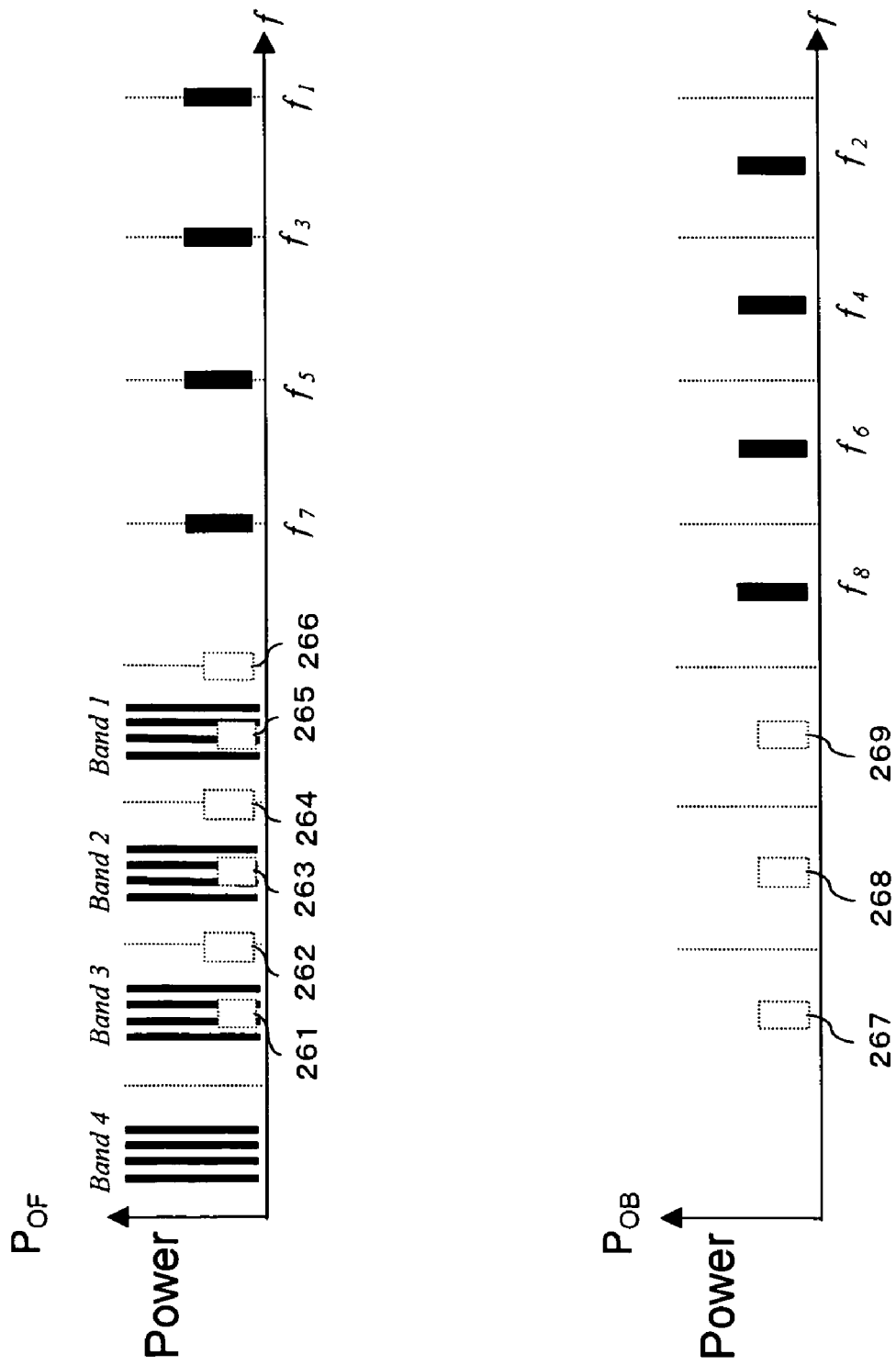
FIG. 35 shows spectra in allocating frequencies of co-propagating pumps on a frequency grid.

FIG. 35 shows spectra in such a bi-directional pumping scheme. Signal waves in four signal bands (Band 1 through Band 4) and pump waves with frequencies $f_1$, $f_3$, $f_5$, and $f_7$ propagate forward and pump waves with frequencies $f_2$, $f_4$, $f_6$, and $f_8$ propagate backward. The frequencies $f_1$, $f_3$, $f_5$, and $f_7$ are allocated within frequency intervals of width $2\delta f$ around grid frequencies and the frequencies $f_2$, $f_4$, $f_6$, and $f_8$ are allocated between two adjacent grid frequencies.

In the spectrum $P_{OF}$ of forward propagating light, the FWM product 262 originates from degenerate FWM between $f_1$ and $f_7$, and the FWM product 264 from degenerate FWM between $f_3$ and $f_7$ and FWM among $f_1$, $f_5$, and $f_7$. The FWM product 266 originates from degenerate FWM between $f_5$ and $f_7$, degenerate FWM between $f_1$ and $f_5$, FWM among $f_3$, $f_5$, and $f_7$, and FWM among $f_1$, $f_3$, and $f_7$. In the spectrum $P_{OB}$ of backward propagating light, the FWM product 267 originates from degenerate FWM between $f_2$ and $f_8$, and the FWM product 268 from degenerate FWM between $f_4$ and $f_8$ and FWM among $f_2$, $f_6$, and $f_8$. The FWM product 269 originates from degenerate FWM between $f_6$ and $f_8$, degenerate FWM between $f_2$ and $f_6$, FWM among $f_4$, $f_6$, and $f_8$, and FWM among $f_2$, $f_4$, and $f_8$. The FWM product 267, 268, and 269 generate the backscattered FWM product 261, 263, and 265, respectively, in the signal bands.

Although the unidirectional transmission systems have been discussed in the embodiments described above, the present invention can also be applied to bi-directional transmission systems in which signals propagate in the both directions.

According to the present invention, FWM among Raman pumps is completely eliminated or considerably reduced in the signal wavelength region in an optical communication system employing Raman amplification.

What is claimed is:

1. An amplification system employing Raman amplification with a plurality of pumps to amplify signal light propagating in an optical fiber, comprising:
   a first pump unit for outputting pump light of a part of the plurality of pumps which propagates in same direction as the signal light; and
   a second pump unit for outputting pump light of a remaining part of the plurality of pumps which propagates in opposite direction to the signal light, wherein, propagation directions of wavelengths of the plurality of pumps are chosen such that four-wave mixing products among the wavelengths are minimized in a wavelength region of the signal light, and
   wherein adjacent groups of m neighboring wavelengths of the wavelengths of the pumps propagate in opposite directions with m>=2, starting from i-th wavelength of the wavelengths of the pumps.

2. The amplification system according to claim 1, wherein signal light of all signals propagates in the same direction.

3. An amplification system as recited in claim 1,
   wherein the Raman amplification is employed using M depolarized pumps to amplify the signal light propagating in a first direction in the optical fiber,
   wherein said first pump unit outputs the pump light of a pump closest to a signal band of the M depolarized pumps, the output pump light propagating in the first direction, same as the signal light, and
   wherein said second pump unit outputs the pump light of the remaining M-1 pumps of the M depolarized pumps, the output pump light propagating in a second direction opposite to the signal light, center frequencies $f_1$ and $f_{M-1}$ of a shortest and a longest wavelength pump of the M-1 pumps chosen such that at least one condition of that $f_{M-1} > f_0$, that $f_0 > f_1$, and that $2f_{M-1}-f_1 > f_s+2\delta f_{M-1}+\delta f_1$ is fulfilled with $f_0$, $f_s$, $2\delta f_1$, and $2\delta f_{M-1}$ as a zero dispersion frequency of the optical fiber, a highest frequency of the signal light, a frequency separation between orthogonal waves of the shortest wavelength pump, and a frequency separation between orthogonal waves of the longest wavelength pump, respectively.

4. An amplification system as recited in claim 1,
wherein the Raman amplification is employed using M depolarized pumps to amplify the signal light propagating in a first direction in the optical fiber,
wherein said first pump unit outputs the pump light of two pumps closest to a signal band of the M depolarized pumps, the output pump light propagating in the first direction same as the signal light, center frequencies $f_{M-1}$ and $f_M$ of a shorter and a longer wavelength pump of the two pumps chosen such that $2f_M - f_{M-1} > f_s + 2\delta f_M + \delta f_{M-1}$ with $f_s$, $2\delta f_{M-1}$, and $2\delta f_M$ as a highest frequency of the signal light, a frequency separation between orthogonal waves of the shorter wavelength pump, and a frequency separation between orthogonal waves of the longer wavelength pump, and
wherein said second pump unit outputs the pump light of the other M-2 pumps of the M depolarized pumps, the output pump light propagating in a second direction opposite to the signal light, center frequencies $f_1$ and $f_{M-2}$ of a shortest and a longest wavelength pump of the M-2 pumps chosen such that at least one condition of that $f_{M-2} > f_0$, that $f_0 > f_1$, and that $2f_{M-2} - f_1 > f_s + 2\delta f_{M-2} + \delta f_1$ is fulfilled with $f_0$, $2\delta f_1$, and $2\delta f_{M-2}$ as a zero dispersion frequency of the optical fiber, a frequency separation between orthogonal waves of the shortest wavelength pump, and a frequency separation between orthogonal waves of the longest wavelength pump, respectively.

5. An amplification system as recited in claim 1,
wherein the Raman amplification is employed using three depolarized pumps to amplify signal light propagating in a first direction in the optical fiber,
wherein said first pump unit for outputting pump light of a longest wavelength pump of the three depolarized pumps, the output pump light propagating in the first direction, same as the signal light, and
wherein said second pump unit for outputting pump light of the other two pumps of the three depolarized pumps, the output pump light propagating in a second direction opposite to the signal light, center frequencies $f_1$ and $f_2$ of a shorter and a longer wavelength pump of the two pumps chosen such that at least one condition of that $f_2 > f_0$, that $f_0 > f_1$, and that $2f_2 - f_1 > f_s + 2\delta f_2 + \delta f_1$ is fulfilled with $f_0$, $f_s$, $2\delta f_1$, and $2\delta f_2$ as a zero dispersion frequency of the optical fiber, a highest frequency of the signal light, a frequency separation between orthogonal waves of the shorter wavelength pump, and a frequency separation between orthogonal waves of the longer wavelength pump, respectively.

6. An amplification system as recited in claim 1,
wherein the Raman amplification is employed using four depolarized pumps to amplify signal light propagating in a first direction in the optical fiber,
wherein said first pump unit for outputting pump light of a pump closest to a signal band of the four depolarized pumps, the output pump light propagating in the first direction, same as the signal light, and
wherein said second pump unit for outputting pump light of the other three pumps of the four depolarized pumps, the output pump light propagating in a second direction opposite to the signal light, center frequencies $f_1$ and $f_3$ of a shortest and a longest wavelength pump of the three pumps chosen such that at least one condition of that $f_3 > f_0$, that $f_0 > f_1$, and that $2f_3 - f_1 > f_s + 2\delta f_3 + \delta f_1$ is fulfilled with $f_0$, $f_s$, $2\delta f_1$, and $2\delta f_3$ as a zero dispersion frequency of the optical fiber, a highest frequency of the signal light, a frequency separation between orthogonal waves of the shortest wavelength pump, and a frequency separation between orthogonal waves of the longest wavelength pump, respectively.

7. An amplification system as recited in claim 1,
wherein the Raman amplification is employed using four depolarized pumps to amplify signal light propagating in a first direction in the optical fiber,
wherein said first pump unit for outputting pump light of two pumps closest to a signal band of the four depolarized pumps, the output pump light propagating in the first direction, same as the signal light, center frequencies $f_3$ and $f_4$ of a shorter and a longer wavelength pump of the two pumps chosen such that $2f_4 - f_3 > f_s + 2\delta f_4 + \delta f_3$ with $f_s$, $2\delta f_3$, and $2\delta f_4$ as a highest frequency of the signal light, a frequency separation between orthogonal waves of the shorter wavelength pump, and a frequency separation between orthogonal waves of the longer wavelength pump, and
wherein said second pump unit for outputting pump light of the other two pumps of the four depolarized pumps, the output pump light propagating in a second direction opposite to the signal light, center frequencies $f_1$ and $f_2$ of a shorter and a longer wavelength pump of the other two pumps chosen such that at least one condition of that $f_2 > f_0$, that $f_0 > f_1$, and that $2f_2 - f_1 > f_s + 2\delta f_2 + \delta f_1$ is fulfilled with $f_0$, $2\delta f_1$, and $2\delta f_2$ as a zero dispersion frequency of the optical fiber, a frequency separation between orthogonal waves of the shorter wavelength pump, and a frequency separation between orthogonal waves of the longer wavelength pump, respectively.

8. An amplification system as recited in claim 1,
wherein the Raman amplification is employed using four depolarized pumps to amplify signal light propagating in a first direction in the optical fiber,
wherein said first pump unit for outputting pump light of two pumps farthest to a signal band of the four depolarized pumps, the output pump light propagating in the first direction, same as the signal light, center frequencies $f_1$ and $f_2$ of a shorter and a longer wavelength pump of the two pumps chosen such that $2f_2 - f_1 > f_s + 2\delta f_2 + \delta f_1$ with $f_s$, $2\delta f_1$, and $2\delta f_2$ as a highest frequency of the signal light, a frequency separation between orthogonal waves of the shorter wavelength pump, and a frequency separation between orthogonal waves of the longer wavelength pump, and
wherein said second pump unit for outputting pump light of the other two pumps of the four depolarized pumps, the output pump light propagating in a second direction opposite to the signal light, center frequencies $f_3$ and $f_4$ of a shorter and a longer wavelength pump of the other two pumps chosen such that at least one condition of that $f_4 > f_0$, that $f_0 > f_3$, and that $2f_4 - f_3 > f_s + 2\delta f_4 + \delta f_3$ is fulfilled with $f_0$, $2\delta f_3$, and $2\delta f_4$ as a zero dispersion frequency of the optical fiber, a frequency separation between orthogonal waves of the shorter wavelength pump, and a frequency separation between orthogonal waves of the longer wavelength pump, respectively.

9. An amplification system as recited in claim 1,
wherein the Raman amplification is employed using four depolarized pumps to amplify signal light propagating in a first direction in the optical fiber,
wherein said first pump unit for outputting pump light of a shortest and a third shortest wavelength pump of the four depolarized pumps, the output pump light propagating in the first direction, same as the signal light, center frequencies $f_1$ and $f_3$ of the shortest and the third shortest wavelength pump chosen such that $2f_3 - f_1 > f_{s1} +$ $2\delta f_3+\delta f_1$ with $f_{s1}$, $2\delta f_1$, and $2\delta f_3$ as a highest frequency of a first signal band of the signal light, a frequency separation between orthogonal waves of the shortest wavelength pump, and a frequency separation between orthogonal waves of the third shortest wavelength pump, and wherein said second pump unit for outputting pump light of a second shortest and a longest wavelength pump of the four depolarized pumps, the output pump light propagating in a second direction opposite to the signal light, center frequencies $f_2$ and $f_4$ of the second shortest and the longest wavelength pump chosen such that at least one condition of that $f_4>f_0$, that $f_0>f_2$, and that $f_{s2}-2\delta f_4-\delta f_2>2f_4-f_2>f_{s3}+2\delta f_4+\delta f_2$ is fulfilled with $f_0$, $f_{s2}$, $f_{s3}$, $2\delta f_2$, and $2\delta f_4$ as a zero dispersion frequency of the optical fiber, a lowest frequency of the first signal band, a highest frequency of a second signal band of the signal light, a frequency separation between orthogonal waves of the second shortest wavelength pump, and a frequency separation between orthogonal waves of the longest wavelength pump, respectively, and with $f_{s3}>f_{s2}$.

10. An amplification system as recited in claim 1, wherein the Raman amplification is employed using five depolarized pumps to amplify signal light propagating in a first direction in the optical fiber, wherein said first pump unit for outputting pump light of a pump closest to a signal band of the five depolarized pumps, the output pump light propagating in the first direction, same as the signal light, and wherein said second pump unit for outputting pump light of the other four pumps of the five depolarized pumps, the output pump light propagating in a second direction opposite to the signal light, center frequencies $f_1$ and $f_4$ of a shortest and a longest wavelength pump of he four pumps chosen such that at least one condition of that $f_4>f_0$, that $f_0>f_1$, and that $2f_4-f_1>f_s+2\delta f_4+\delta f_1$ is fulfilled with $f_0$, $f_s$, $2\delta f_1$, and $2\delta f_4$ as a zero dispersion frequency of the optical fiber, a highest frequency of the signal light, a frequency separation between orthogonal waves of the shortest wavelength pump, and a frequency separation between orthogonal waves of the longest wavelength pump, respectively.

11. An amplification system as recited in claim 1, wherein the Raman amplification is employed using five depolarized pumps to amplify signal light propagating in a first direction in the optical fiber, wherein said first pump unit for outputting pump light of two pumps closest to a signal band of the five depolarized pumps, the output pump light propagating in the first direction, same as the signal light, center frequencies $f_4$ and $f_5$ of a shorter and a longer wavelength pump of the two pumps chosen such that $2f_5-f_4>f_s+2\delta f_5+\delta f_4$ with $f_s$, $2\delta f_4$, and $2\delta f_5$ as a highest frequency of the signal light, a frequency separation between orthogonal waves of the shorter wavelength pump, and a frequency separation between orthogonal waves of the longer wavelength pump, and wherein said second pump unit for outputting pump light of the other four pumps of the five depolarized pumps, the output pump light propagating in a second direction opposite to the signal light, center frequencies $f_1$ and $f_3$ of a shortest and a longest wavelength pump of the four pumps chosen such that at least one condition of that $f_3>f_0$, that $f_0>f_1$, and that $2f_3-f_1>f_s+2\delta f_3+\delta f_1$ is fulfilled with $f_0$, $2\delta f_1$, and $2\delta f_3$ as a zero dispersion frequency of the optical fiber, a frequency separation between orthogonal waves of the shortest wavelength pump, and a frequency separation between orthogonal waves of the longest wavelength pump, respectively.

12. An amplification system as recited in claim 1, wherein the Raman amplification is employed using five depolarized pumps to amplify signal light propagating in a first direction in the optical fiber, wherein said first pump unit for outputting pump light of a second shortest and a fourth shortest wavelength pump of the four depolarized pumps, the output pump light propagating in the first direction, same as the signal light, center frequencies $f_2$ and $f_4$ of the second shortest and the fourth shortest wavelength pump chosen such that $2f_4-f_2>f_s+2\delta f_4+\delta f_2$ with $f_s$, $2\delta f_2$, and $2\delta f_4$ as a highest frequency of the signal light, a frequency separation between orthogonal waves of the second shortest wavelength pump, and a frequency separation between orthogonal waves of the fourth shortest wavelength pump, and p1 wherein said second pump unit for outputting pump light of the other three pumps of the five depolarized pumps, the output pump light propagating in a second direction opposite to the signal light, center frequencies $f_1$ and $f_5$ of a shortest and a longest wavelength pump of the three pumps chosen such that one condition of that $f_5>f_0$ and that $f_0>f_1$ is fulfilled with $f_0$ as a zero dispersion frequency of the optical fiber.

13. An amplification system employing Raman amplification with a plurality of pumps to amplify signal light propagating in an optical fiber, comprising:

a pump unit for outputting pump light of a part of the plurality of pumps which co- and counter-propagate to the signal light, propagation directions of wavelengths of the plurality of pumps chosen such that four-wave mixing products among the wavelengths are minimized in a wavelength region of the signal light; and an optical coupler for supplying the pump light output from said pump unit to the optical fiber, and wherein adjacent groups of m neighboring wavelengths of the wavelengths of the pumps propagate in opposite directions with m>=2, starting from i-th wavelength of the wavelengths of the pumps.

14. A method of amplifying signal light propagating in an optical fiber by Raman amplification with a plurality of pumps, comprising: choosing propagation directions of wavelengths of the plurality of pumps such that four-wave mixing products among the wavelengths are minimized in a wavelength region of the signal light;

propagating pump light of a part of the plurality of pumps in same direction as the signal light; and propagating pump light of a remaining part of the plurality of pumps in opposite direction to the signal light, wherein adjacent groups of m neighboring wavelengths of the wavelengths of the pumps propagate in opposite directions with m>=2, starting from i-th wavelength of the wavelengths of the pumps.

15. An amplification system employing Raman amplification with a plurality of pumps to amplify signal light propagating in an optical fiber, comprising:

first pump means for outputting pump light of a part of the plurality of pumps which propagates in same direction as the signal light; and second pump means for outputting pump light of a remaining part of the plurality of pumps which propagates in opposite direction to the signal light, wherein propagation directions of wavelengths of the plurality of pumps are chosen such that four-wave mixing products among the wavelengths are minimized in a wavelength region of the signal light, and wherein adjacent groups of m neighboring wavelengths of the wavelengths of the pumps propagate in opposite directions with m>=2, starting from i-th wavelength of the wavelengths of the pumps.

* * * * *

UNITED STATES PATENT AND TRADEMARK OFFICE
CERTIFICATE OF CORRECTION

PATENT NO. : 7,054,060 B2
APPLICATION NO. : 10/998173
DATED : May 30, 2006
INVENTOR(S) : Rainer Hainberger et al.

It is certified that error appears in the above-identified patent and that said Letters Patent is hereby corrected as shown below:

Column 10, Line 41, change "adiacent" to --adjacent--.

Column 11, Line 8, after "direction" insert --,--.

Column 13, Line 22, change "fs3>fs2." to --fs3<fs2.--.

Column 13, Line 35, after "pump of" change "he" to --the--.

Column 14, Line 19, after "and" delete "p1".

Column 14, Line 52, change "adiacent" to --adjacent--.

Column 15, Line 3, change "adiacent" to --adjacent--.

Signed and Sealed this

Fourteenth Day of November, 2006

JON W. DUDAS
*Director of the United States Patent and Trademark Office*